(12) United States Patent
Voll et al.

(10) Patent No.: US 6,170,018 B1
(45) Date of Patent: *Jan. 2, 2001

(54) REMOTE PROCEDURE CALLING USING AN EXISTING DESCRIPTOR MECHANISM

(75) Inventors: James J. Voll; Graham Hamilton, both of Palo Alto; Panagiotis Kougiouris, San Francisco; Steven R. Kleiman, Los Altos, all of CA (US)

(73) Assignee: Sun MicroSystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/563,155

(22) Filed: Nov. 27, 1995

(51) Int. Cl.$^7$ ................................. G06F 15/63; G06F 9/00
(52) U.S. Cl. .................................. 709/304; 707/8
(58) Field of Search .................... 395/684, 200, 395/608; 709/300–305

(56) References Cited

U.S. PATENT DOCUMENTS

| 5,175,852 | * | 12/1992 | Johnson et al. | ....................... | 395/608 |
| 5,566,302 | * | 10/1996 | Khalidi et al. | ........................ | 395/200 |

OTHER PUBLICATIONS

Hamilton et al; Subcontract: a flexible base for distributed programming; Proceedings of 14th Symposium on OS Principles, Dec. 1993.*
Rosenthal, David; Evolving the Vnode Interface; USENIX Summer Conference, Jun. 11, 1990.*
Brian N. Bershad et al., Lightweight Remote Procedure Call, Feb. 1990, ACM Transactions on Computer Systems, vol. 8, No. 1.

Bryan Ford et al., Evolving Mach 3.0 to a Migrating Thread Model, Jan 17–21, 1994, 1994 Winter USENIX.
S.R. Kleinman, Vnodes: An Architecture for Multiple File Types in Sun UNIX, Jun. 9–13, 1986, USENIX Association Summer Conference Proceedings.
Graham Hamilton et al., The Spring nucleus: A microkernel for objects, Jun. 21–25, 1993, Proceedings of the Summer 1993 USENIX Conference.

(List continued on next page.)

Primary Examiner—Majid A. Banankhah
Assistant Examiner—P. G. Caldwell
(74) Attorney, Agent, or Firm—Beyer Weaver Thomas & Nguyen, LLP

(57) ABSTRACT

Doors are implemented in an existing operating system by using a novel adaptation of existing data structures and procedures which represent and control data files of the operating system. A door is represented by a file descriptor and is managed by existing mechanisms of an operating system, such as the Unix operating system, which are also used to manage files. A door is represented by a door node, which is a novel extension of the conventional vnode structure which in turn is used in conventional operating systems to represent the state of a computer resource, e.g., a data file. A door node is adapted such that most conventional file access and control procedures, e.g., procedures open( ) and close( ), can be used to access and control door with minimal adaptation. A door node is formed by appending fields which are specific to a door node's representation of the state of a door to fields of the door node which are analogous to the fields of a vnode, which represents the state of a resource and which has a conventional structure. Thus, the fields of a door node which precede the fields specific to the representation of the state of a door are of the size, location, and format of analogous fields in a conventional vnode. A client process obtains a file descriptor which identifies a door by supplying the name of the door to the operating system.

38 Claims, 12 Drawing Sheets

OTHER PUBLICATIONS

James G. Mitchell et al., An Overview of the Spring System, Feb. 28, 1994–Mar. 4, 1994, Intellectual Leverage: Digest of Papers of the Spring Computer Society International Conference.

Loong et al, A Comprehensive Lightweight InterDomain Procedure Call Mechanism for Concurrent Computations.*

Accetta et al, "Mach: A New Kernel Foundation For Unix Development", Proceedings of Summer Usenix, Jul. 1986 pp 93–112.*

Boykin et al; *Programming under Mach*, Chaps 1,2,3,7; Sep. 1993.*

Brent Welch, "A comparision of the vnode and Sprite file system architectures", May 1992.*

Yousef Khalidi et al, "Extensible file systems in Spring", Sep. 1993.*

* cited by examiner

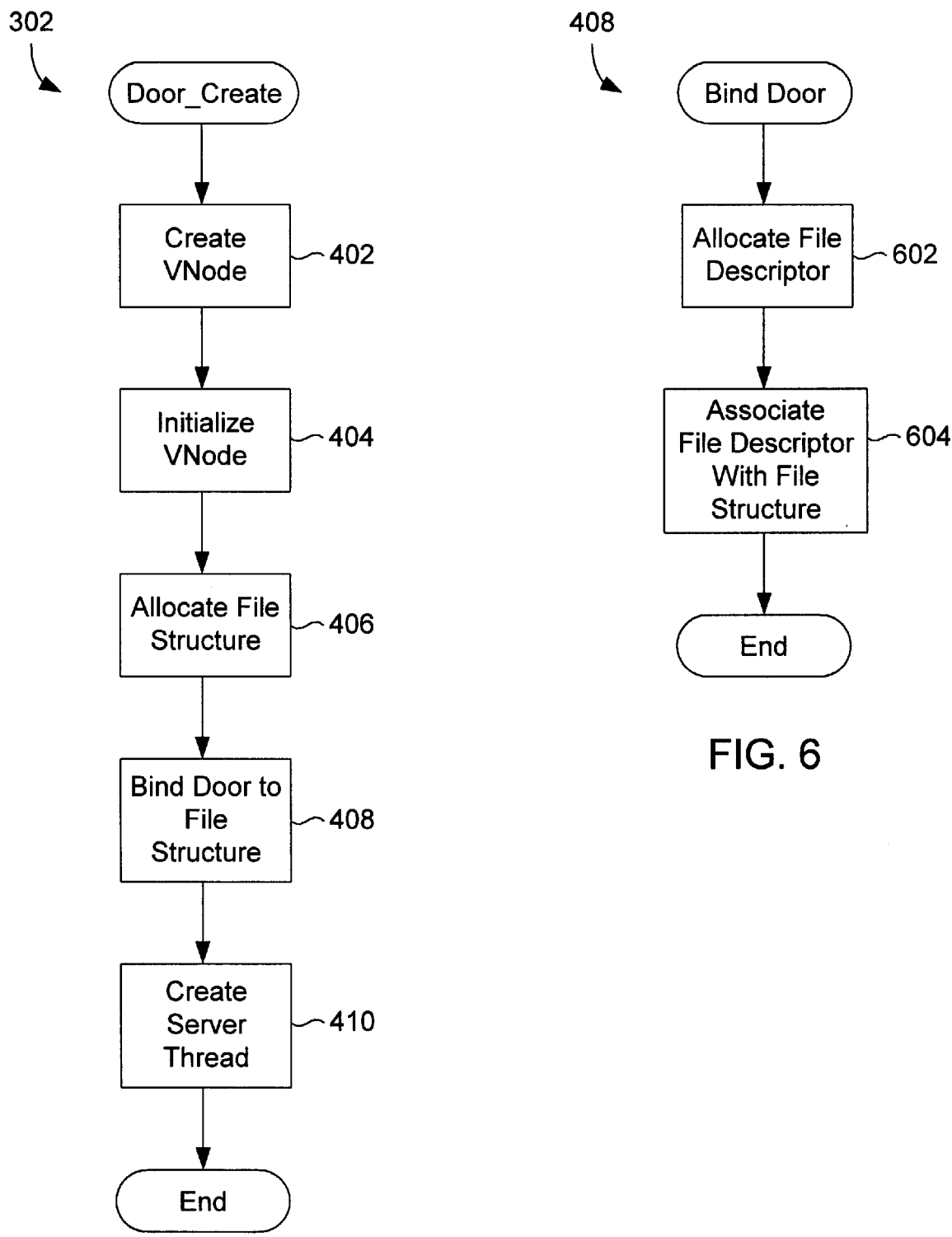
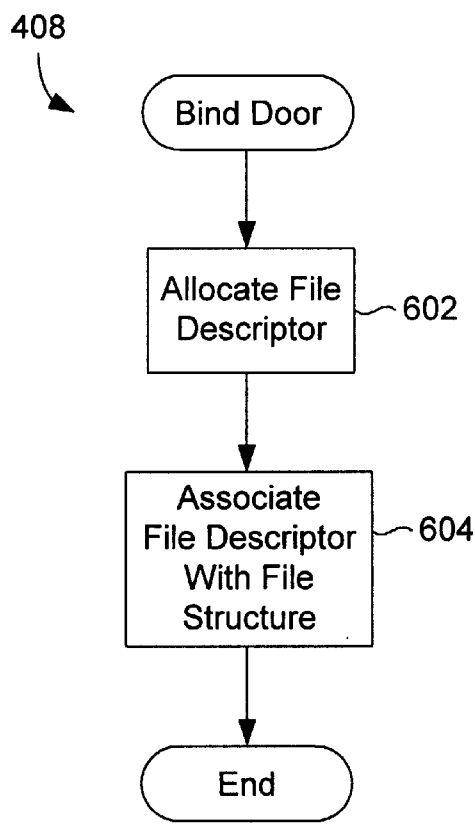
FIG. 4
FIG. 6

REMOTE PROCEDURE CALLING USING AN EXISTING DESCRIPTOR MECHANISM

FIELD OF THE INVENTION

The present invention relates to communication between computer processes and, in particular, to a particularly efficient system and method for remote procedure calling which uses existing mechanisms to provide a seamless and relatively uncomplicated programmer interface.

BACKGROUND OF THE INVENTION

Doors are a relatively efficient mechanism for communication between computer processes (i.e., inter-process communication or "IPC") and, in particular, for remote procedure calling (i.e., "RPC") in which a first computer process invokes a procedure which is defined and executed by a second computer process. Doors are known and are described, for example, in Graham Hamilton and Panos Kougiouris, "The Spring nucleus: A microkernel for objects," *Usenix Conference* 1993, at 147–160 (June 1995). Doors are briefly described for completeness.

In general, a door is a portion of memory in the kernel of an operating system which is used to facilitate a secure transfer of control and data between a client thread of a first computer process and a server thread of a second computer process. Some of the components of a computer system which are used to implement doors are briefly described. An operating system is generally a set of computer programs which enable a computer to (i) understand and process commands, (ii) control input and output of the computer through various input and output devices, (iii) schedule computer processes for execution, (iv) manage data stored in various storage devices of the computer, and (v) control the operation of peripheral devices coupled to the computer. The kernel of an operating system is that portion of the operating system which (i) manages the interface between user programs and input/output devices, (ii) manages main memory, (iii) schedules computer processes for execution, and (iv) maintains a file system which in turn manages storage of data on various storage devices. The kernel of the Unix operating system is the only part of the Unix operating system which interacts with the hardware components of the computer system in which the Unix operating system executes. All interaction between computer processes and hardware components of the computer system is through the kernel. Accordingly, when an operating system which executes on a first type of computer system is modified to execute on a second type of computer system, only the kernel of the operating system must be so modified.

A computer program is a series of computer instructions and data which, when executed within a computer system, perform a task. A computer process is an execution of a computer program. A single computer program can be executed any number of times, and each execution is a different computer process. Most computer systems in use today permit several computer processes to execute simultaneously within a computer system. In addition to the computer instructions and data of a defining computer program, a computer process includes information stored within the kernel identifying the computer instruction which is currently being executed, the computer instruction which is to be executed next, and the current state of the computer process, including a stack which is used to save previous computer process states for later restoration. In some operating systems, a computer process can create new execution states which are sometimes called "threads," which are independent of the execution state of the computer process, and which execute concurrently with one another and with the computer process within the computer system. Each thread which executes concurrently is independently scheduled for execution by the kernel. Such a computer process having multiple threads is generally called a "multi-threaded" computer process or is sometimes referred to as a "light-weight process." Each thread of a computer process executes in the context of the computer process. In particular, each thread shares the address space of the computer process and resources are allocated to a computer process, and therefore all threads of the computer process, rather than an individual thread.

It is sometimes desirable to allow a computer process to perform an operation without granting to the computer process the authority to perform similar, but different, operations. For example, it can be desirable to permit one computer process to monitor the status of other computer processes without granting to the former computer process other access to the other computer processes. Therefore, a computer process, which is called the server process and which generally has the authority to perform an operation called the subject operation, can allow other computer processes, which are called client processes and which generally do not have such authority, to perform the operation within the address space of and under the authority of the server process. For example, a server process can monitor the status of various computer processes at the request of a client process which has no direct access to the other computer processes.

Doors are a particularly efficient mechanism for RPC. In invoking RPC using a door, a client process (i) transfers to the kernel a buffer which contains arguments consumed by performance of the subject operation and which will contain results produced by performance of the subject operation and (ii) instructs the kernel to initiate performance of the subject operation. In creating the door, the server process creates and sets aside a thread, sometimes referred to as a "server thread," which typically exists solely for the purpose of performing the subject operation at the request of a client process. When the kernel invokes performance of the subject operation, the kernel immediately executes the server thread in place of the client process and immediately executes the client process in place of the server thread when the subject operation terminates. While the client process executes, the server thread is ready to execute; and while the server thread executes, the client process is ready to execute. Since the kernel immediately suspends execution of one computer process for execution of another, very little processing is required to transfer control from the client process to the server thread and back again in comparison to other RPC mechanisms in which the kernel uses conventional computer process scheduling mechanisms to temporarily suspend execution of the client process and resume execution of the server process. Thus, overhead associated with other, more complex synchronization objects such as semaphores and condition variables is avoided.

Doors are a safe IPC mechanism since the server thread executes in the context of the computer process which creates the door and the server thread. Accordingly, a client process can invoke a door securely, i.e., without concern that execution of the subject operation in the context of the server process will cause harm to the client process, since a thread of one computer process is generally not permitted to interfere with a thread of another computer process. The subject operation retrieves the arguments from the buffer in the kernel, acts in accordance with the computer instructions of the subject operation, and stores in the buffer results produced by execution of the subject operation. Upon completion of the subject operation, the subject operation notifies the kernel of the completion, and the kernel, in response to such notification, immediately executes the client process in place of the server thread as described above. Thus, in performing the subject operation and in returning processing to the client process, the server thread has no direct access to the client process.

In addition, doors are created by the server process and cannot be created by the client process. Therefore, the client process cannot create its own door to access other computer processes. Thus, doors are secure in that each computer process must explicitly grant to other computer processes access to itself.

Doors have yet to be implemented in any commercially available operating system. Contributing to the delay in implementing doors is the complexity in implementing door management mechanisms and in the added complexity in operating systems in which such mechanisms are implemented. For example, necessary mechanisms include mechanisms to create and destroy doors, to duplicate and discard descriptors of doors, to invoke and return from doors, to give doors names by which client processes can identify and invoke respective doors, and providing limits on the number of doors a computer process can create. By adding such mechanisms to an operating system, the complexity and resource requirements of the operating system increase accordingly. Such is significant since currently used operating systems already require substantial resources, including processor speed, memory capacity, and non-volatile storage capacity. Requiring additional resources for the operating system leaves less resources for the remaining computer processes, including user applications which frequently perform complex calculations requiring substantial resources of their own.

Providing additional mechanisms such as those listed above further complicate the task of a software engineer constructing computer programs for execution as computer processes within such an operating system. Each of these mechanisms must be learned and mastered by a software engineer who constructs a computer program which uses doors when executed. Some currently available computer instruction languages, which include access to mechanisms provided by an operating system, are sufficiently complex that few people, if any, are familiar with all aspects of the computer instruction language. Such a computer instruction language is the C++ computer instruction language. Adding further mechanisms to such a computer instruction language, in the form of access to operating system mechanisms such as those listed above makes mastery of such a computer instruction language even more difficult.

What therefore remains as an unsatisfied need is a series of mechanisms by which doors can be implemented in an operating system without adding excessively to the complexity and resource requirements of the operating system and without excessively increasing the material which a software engineer must master to construct computer programs which use doors.

SUMMARY OF THE INVENTION

In accordance with the present invention, a door is represented by a file descriptor and is managed by existing mechanisms of an operating system, such as the Unix operating system, which are also used to manage files. A door is represented by a door node, which is a novel extension of the conventional vnode structure which in turn is used in conventional operating systems to represent the state of a computer resource, e.g., a data file. A door node is adapted such that most conventional file access and control procedures, e.g., procedures open( ) and close( ), can be used to access and control a door with minimal adaptation. As a result, the implementation of doors in an existing operating system is simplified. In addition, the interface with which a client computer process accesses and controls doors is consistent and compatible with the interface with which a computer process accesses and controls resources of the computer system, e.g., data files. Accordingly, a software engineer developing and configuring such a client computer process uses a relatively homogeneous interface between the computer process and system resources and between the computer process and doors. Therefore, the mastery by such a software engineer of the procedures by which doors are controlled and accessed is substantially minimized.

A door node is structured such that requisite adaptation of the access and control procedures is substantially minimized by appending fields which are specific to a door node's representation of the state of a door to a vnode, which represents the state of a resource and which has a conventional structure. Thus, the fields of a door node which precede the fields specific to the representation of the state of a door are of the size, location, and format of analogous fields in a conventional vnode. As a result, many conventional procedures which are used to control and access other resources can be used to control and access doors without substantial adaptation.

As a result of the novel implementation of doors in accordance with the present invention, conventional mechanisms with which software engineers are familiar and which are used to associate a name with a particular resource are used to associate a name with a door. Accordingly, a client process obtains a file descriptor which identifies a door by supplying the name of the door to the operating system.

The present invention therefore represents a novel implementation of doors in which an existing operating system can implement door with minimal adaptation and with minimal increases in complexity of the operating system.

BRIEF DESCRIPTION OF THE DRAWINGS

FIG. 4 is a logic flow diagram representing the creation of a door in accordance with the present invention.

FIG. 6 is a logic flow diagram of the binding of a door to a file structure in accordance with the present invention.

DETAILED DESCRIPTION

In accordance with the present invention, doors are implemented in a novel fashion such that conventional mechanisms with which users are familiar can be used to create, invoke, and delete doors. In particular, doors are implemented as a novel extension of a conventional file system of an operating system, e.g., the known Unix operating system. Computer processes create, duplicate, name, pass to other computer processes, and discard door descriptors, each of which specifies a particular door, using the same conventional mechanisms by which file descriptors are created, duplicated, passed, and discarded and with which software engineers who design and implement such computer processes are familiar.

As a result, software engineers are presented with a relatively homogeneous programming environment in which resources such as files and doors are accessed and managed according to a single protocol. For example, a software engineer configures a computer process to access a file by including in the computer process an invocation of the conventional procedure open( ), supplying a well-publicized name of the file to be opened and receiving as a result a file descriptor which specifies the file corresponding to the well-publicized name. In an analogous manner, the software engineer configures the computer process to access a door by including in the computer process an invocation of the procedure open( ), supplying a well-publicized name of the door to be opened and receiving as a result a file descriptor which specifies the door corresponding to the well-publicized name. As described below, a computer process can obtain a file descriptor corresponding to a door in other ways as well.

Doors

Figure 1:
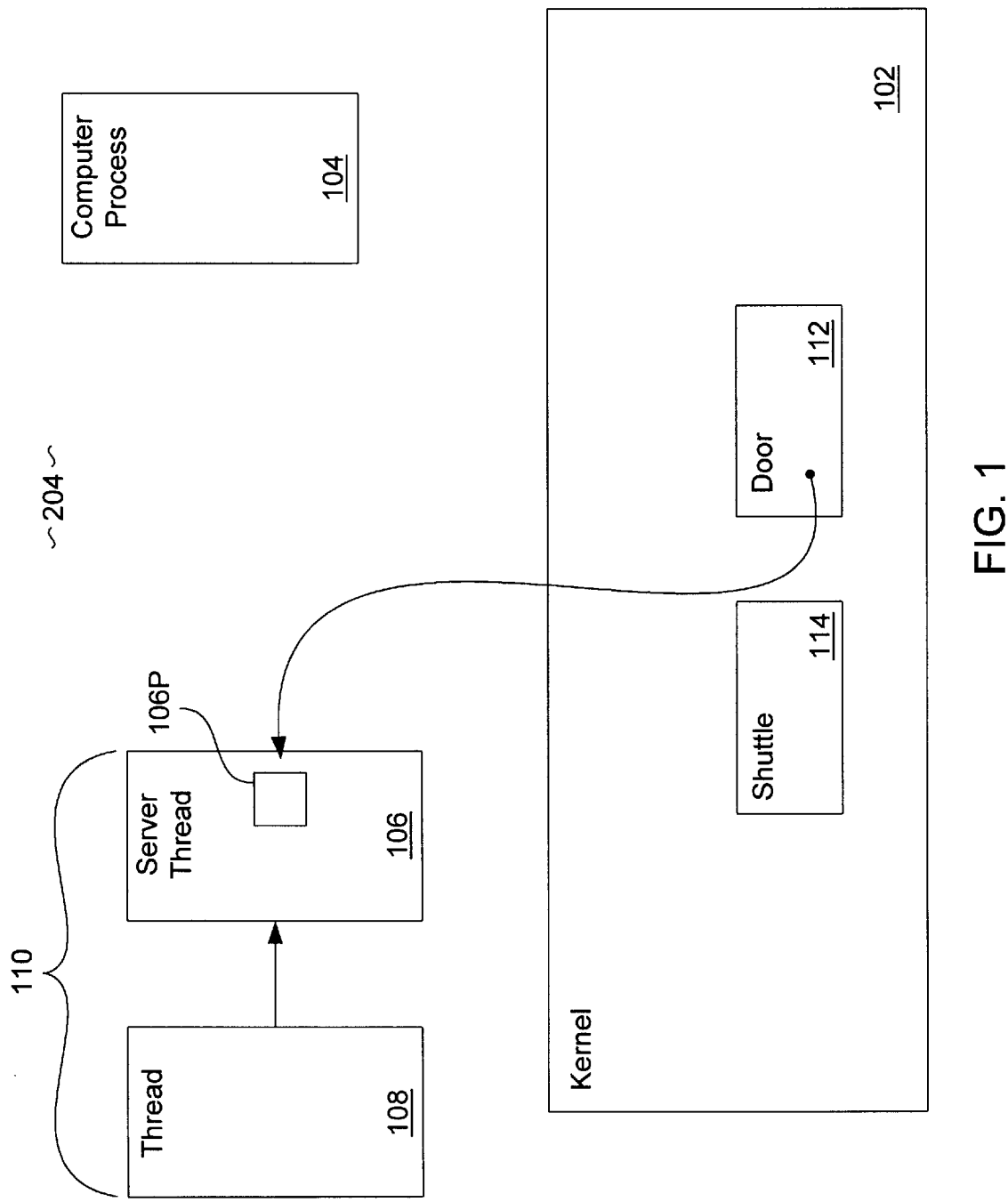
FIG. 1 is a block diagram illustrating the invocation of a door in accordance with the present invention.

Doors are described briefly to facilitate appreciation of the present invention. FIG. 1 is a block diagram of several computer processes 102, 104, and 110 executing within a computer system 200 (FIG. 2) which is described more completely below. Computer process 104 (FIG. 1) is a client process and invokes execution of a server thread 106 of computer process 110 by use of a door 112. Computer process 110 is a server process and is multi-threaded. Initially, computer process 110 includes only a single thread 108, execution of which creates door 112 and server thread 106. Execution of server thread 106 is suspended shortly after initiated and is resumed when door 112 is invoked by a client process, e.g., computer process 104. Server thread 106 includes a procedure 106P, which is sometimes referred to herein as subject procedure 106P and which defines the processing of server thread 106 in response to an invocation of door 112.

Figure 2:
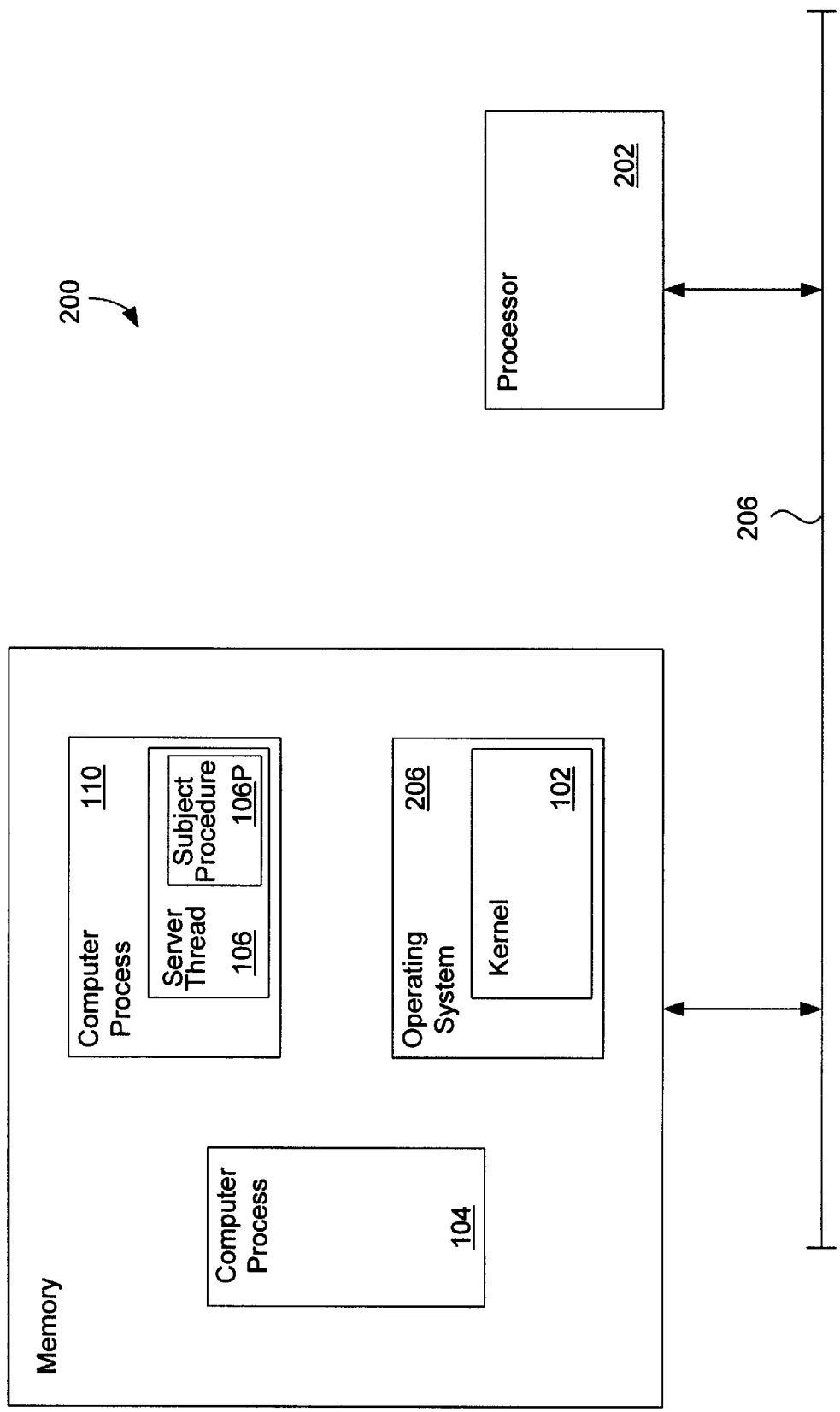
FIG. 2 is a block diagram of a computer system in which doors are implemented in accordance with the present invention.

Computer process 102, which is sometimes referred to as kernel 102, is the kernel of computer system 200 (FIG. 2). By invocation of door 112 (FIG. 1) by computer process 104, kernel 102 suspends execution of computer process 104 and resumes execution of server thread 106. Kernel 102 uses a scheduling object to determine when to suspend or resume execution of each of a number of computer processes which execute concurrently within computer system 200 (FIG. 2) and which share one or more resources of computer system 200. Kernel 102 (FIG. 1) can use a conventional scheduling object such as a semaphore or a condition variable, both of which are well known and are not described further herein. Such scheduling objects are useful when one computer process has no access to information regarding the state of other computer processes. In such circumstances, sophisticated mechanisms are required to manage concurrent execution of such concurrently executing computer processes. However, a few observations regarding the relationship between computer process 104 and server thread 106 make particularly suitable a rather simple and uncomplicated scheduling object, i.e., shuttle 114.

First, execution of server thread 106 should not resume until door 112 is invoked and should resume immediately upon invocation of door 112. Second, execution of computer process 104 should be suspended immediately upon invocation of door 112, should remain suspended during execution of server thread 106, and should resume immediately following suspension of execution of server thread 106, i.e., when processing of door 112 by server thread 106 completes. Thus, computer process 104 and server thread 106 act as co-routines. In effect, the subject procedure of door 112, e.g., procedure 106P of server thread 106, is inserted into the sequence of computer instructions of computer process 104 but is executed in the context of server thread 106.

As a result, no sophisticated synchronization mechanisms are required to coordinate execution of computer process 104 and server thread 106; one simply follows the other. Accordingly, shuttle 114 immediately resumes execution of server thread 106 when execution of computer process 104 is suspended by invocation of door 112 and immediately resumes execution of computer process 104 when execution of server thread 106 is suspended as a result of completion of processing according to procedure 106P. Shuttle 114 presumes that server thread 106 has access to all requisite resources, including door 112, when computer process 104 invokes door 112 and that computer process 104 has access to all requisite resources, including door 112, when server thread 106 completes processing according to subject procedure 106P in response to invocation of door 112. Since shuttle 114 does not check for requisite resources prior to suspending or resuming execution of a computer process, shuttle 114 effects a particularly efficient change from execution of computer process 104 to execution of server thread 106 and vice versa.

Logic flow diagram 300 (FIG. 3) illustrates the interaction between computer processes 110 (FIG. 1) and 104 through door 112 as facilitated by shuttle 114. Thread 108 of computer process 110, server thread 106, shuttle 114, and computer process 104 are each represented in logic flow diagram 300 (FIG. 3) as a column of steps performed by the respective thread or object. For example, steps 302 and 304, which are performed by thread 108 of computer process 110 as described below, are in the left-most column which represents thread 108.

Processing begins in step 302 in which thread 108 of computer process 110 creates door 112 (FIG. 1) and creates server thread 106 to carry out invocations of door 112. The creation of doors and server threads and the execution of a server thread to carry out invocations of a door are described below more completely. From step 302 (FIG. 3), processing transfers to step 304 in which thread 108 assigns a well-publicized name to door 112 (FIG. 1). The name assigned to door 112 is well-publicized by providing to software engineers developing client processes documentation which describes the behavior of server thread 106 upon invocation of door 112 and which provides the name assigned to door 112. Software engineers can then develop client processes, e.g., computer process 104, which access and invoke door 112 using the well-publicized name in the manner described more completely below.

It is appreciated that client processes can obtain access to a door by mechanisms other than a well-publicized name. For example, child processes obtain access to doors to which a parent process has access when the parent process creates the child processes. A parent process can create a child process using, for example, the known "fork( )" procedure. Child processes, parent processes and procedure fork( ) are known and are not described further herein.

While access to a door can be inherited from a parent process by a child process, a mechanism by which access to a door can be obtained by a computer process which cannot inherit such access, e.g., a computer process which has no parent process, must generally be provided. Since, in accordance with the present invention, access to a door is obtained through novel adaptations of conventional file descriptors, conventional mechanisms such as the known procedure "open( )," which provides to a computer process a file descriptor which in turn provides access to a resource given a well-publicized name of the resource, can be used to provide such functionality. In previous implementations of doors, such a mechanism had to be separately provided, adding complexity to the implementation of doors and in the subject matter which users of doors were required to master.

Performance of step 302 (FIG. 3) by thread 108 creates server thread 106 which begins execution at step 306. In step 306, server thread 106 waits for invocation of door 112 and execution of server thread 106 is therefore suspended within computer system 200 (FIG. 2).

Figure 3:
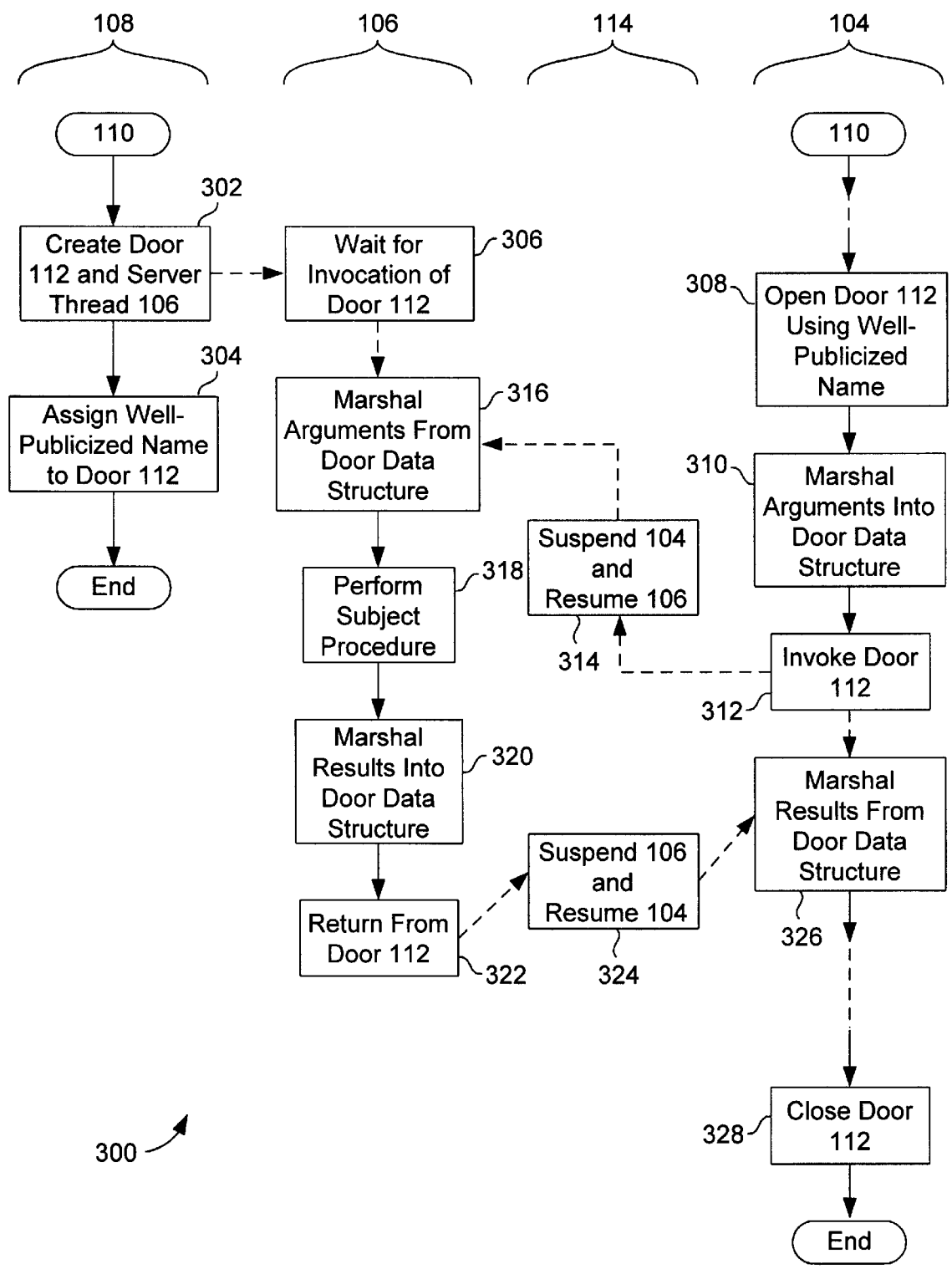
FIG. 3 is a logic flow diagram representing the interaction of several computer processes in carrying out an invocation of a door in accordance with the present invention.

Computer process 104 executes independently from and concurrently with computer process 110 within computer system 200. As used herein, two computer processes execute concurrently within computer system 200 if computer instructions of both computer processes are currently scheduled by kernel 102 for execution in processor 202. It is appreciated that computer instructions of two or more concurrent computer processes are not necessarily executed simultaneously. Computer process 104 can carry out a number of steps unrelated to door 112 (FIG. 1) or threads 106 and 108 prior to step 308 (FIG. 3). In step 308, computer process 104 opens door 112 (FIG. 1) using the well-publicized name assigned to door 112 in step 304 (FIG. 3) in the manner computer process 104 would open a file using a filename. The opening of a door is described in greater detail below. Processing transfers from step 308 to step 310 in which computer process 104 marshals arguments of door 112 (FIG. 1) into door 112. Arguments of a door are data supplied through the door and used by a server process, e.g., server process 106, in carrying out action in accordance with an invocation of the door. Marshaling of arguments or results into a door refers to the movement of such data from a portion of memory allocated to a computer process to the portion of memory allocated to the door. Similarly, marshaling arguments or results from a door refers to movement of such data from the portion of memory allocated to the door to a portion of memory allocated to a computer process.

From step 310 (FIG. 3), processing transfers to step 312 in which computer process 104 invokes door 112 (FIG. 1). The invocation of a door is described more completely below. As part of the invocation of door 112, shuttle 114 suspends execution of computer process 104 and resumes execution of server thread 106 in step 314 (FIG. 3). Execution of server thread 106 resumes at step 316 in which server thread 106 marshals arguments of door 112 (FIG. 1) from door 112. Processing transfers to step 318 (FIG. 3) in which server thread 106 processes the arguments of door 112 (FIG. 1) in accordance with the computer instructions of subject procedure 106P which define the behavior of server thread 106. Processing of arguments in step 318 (FIG. 3) produces results which are data resulting from the execution of subject procedure 106P by server thread 106 and are passed through door 112 (FIG. 1) to computer process 104. Generally, results of a door are data resulting from invocation of the door.

From step 318 (FIG. 3), processing transfers to step 320 in which server thread 106 marshals the results produced in step 318 into door 112 (FIG. 1). In step 322 (FIG. 3), to which processing transfers from step 320, server thread 106 returns from invocation of door 112 (FIG. 1). The returning from invocation of a door is described more completely below. As part of returning from invocation of door 112, shuttle 114 suspends execution of server thread 106 and resumes execution of computer process 104 in step 324 (FIG. 3). Execution of computer process 104 resumes at step 326 in which computer process 104 marshals from door 112 (FIG. 1) the results produced by server thread 106 in step 318 (FIG. 3). From step 326, processing of computer process 104 continues in a generally conventional manner except that computer process 104 can open and invoke doors other than door 112 (FIG. 1) and can again invoke door 112. Prior to completion of the execution of computer process 104, computer process 104 closes door 112 in the manner computer process 104 would close a file in step 328 (FIG. 3). The closing of a door is described in greater detail below.

Thus, by invocation of door 112 (FIG. 1), computer process 104 executes as if step 318 (FIG. 3) were performed by computer process 104. However, step 318 is performed by server thread 106 which is created from and executes with the authority of, and under the resource limits and constraints of, computer process 110. Therefore, any resources consumed by performance of step 318 are not charged to computer process 104 and authority required to carry out step 318 is derived from server thread 106 and not computer process 104. Furthermore, as described more completely below, the mechanisms by which door 112 (FIG. 1) is invoked by computer process 104 is integrated with the interface by which computer process 104 opens, closes, writes to, and reads from files and is therefore already familiar to software engineers developing computer process 104.

Hardware Operating Environment

Most computer systems in use today are of the general organization shown in FIG. 2, which is a block diagram of computer system 200. Computer system 200 includes a processor 202 which is coupled to a memory 204 through a bus 206. Processor 202 fetches from memory 204 and executes computer instructions. In accordance with computer instructions fetched from memory 204 and executed, processor 202 also reads data from memory 204, writes data to memory 204, processes such data, and reads data from and writes data to other input and output devices (not shown) which are coupled to bus 206. In one embodiment, processor 202 is the SPARC™ processor available from Sun Microsystems, Inc. of Mountain View, Calif.

Memory 204 can include any type of memory including without limitation randomly-accessible memory (RAM), read-only memory (ROM), and secondary memory such as magnetic or optical storage media. An operating system 206 executes within processor 202 from memory 204 and controls execution of other computer processes within computer system 200. In one embodiment, operating system 206 is the Solaris™ operating system available from Sun Microsystems, Inc. of Mountain View, Calif. Operating system 206 includes kernel 102. Computer system 200 can be, for example, a SPARCstation™ workstation computer system available from Sun Microsystems, Inc. of Mountain View, Calif. Sun, Sun Microsystems, Solaris, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Also executing within processor 202 from memory 204 are computer processes 104 and 110. Computer process 110 is a light weight process and includes server thread 106 as described above. Computer process 104 can be either single-threaded or multi-threaded. Each thread of computer processes 104 and 110, and other threads of other computer processes (not shown) execute concurrently within computer system 200. In general, process 202 is capable of processing at most one computer process at a time. Operating system 206 manages concurrently executing threads in a conventional manner by (i) determining which of the concurrently executing threads is to be executed, (ii) causing that thread to be executed by processor 202, and (iii) preserving the respective states of and suspending execution of all other threads.

Creation of Doors

As described above, thread 108 (FIG. 1) of computer process 110 creates door 112 in step 302 (FIG. 3). In step 302, thread 108 issues a computer instruction which causes kernel 102 (FIG. 1) to create door 112. In issuing the computer instruction, thread 108 supplies to kernel 102 (i) a pointer to the location within computer process 110 of the subject procedure of door 112, i.e., subject procedure 106P, (ii) an object pointer, which is optionally supplied, and (iii) a number of flags, each of which defines a particular characteristic of door 112. The subject procedure of door 112, i.e., subject procedure 106P, is the procedure within server thread 106 which executes in response to invocation of door 112.

The object pointer is optionally supplied by thread 108 to kernel 102 and identifies an object if the subject procedure is to be performed by an object of computer process 110 in the context of an object-oriented environment. The object identified by the object pointer is referred to as the server object. For example, thread 108 can create a first door supplying a procedure as the subject procedure and a first object as the server object and can create a second door supplying the same procedure as the subject procedure and a second, different object as the server object. Invocation of the first door causes performance of the subject procedure in the context of the first object, and invocation of the second door causes performance of the subject procedure in the context of the second object.

Figure 11:
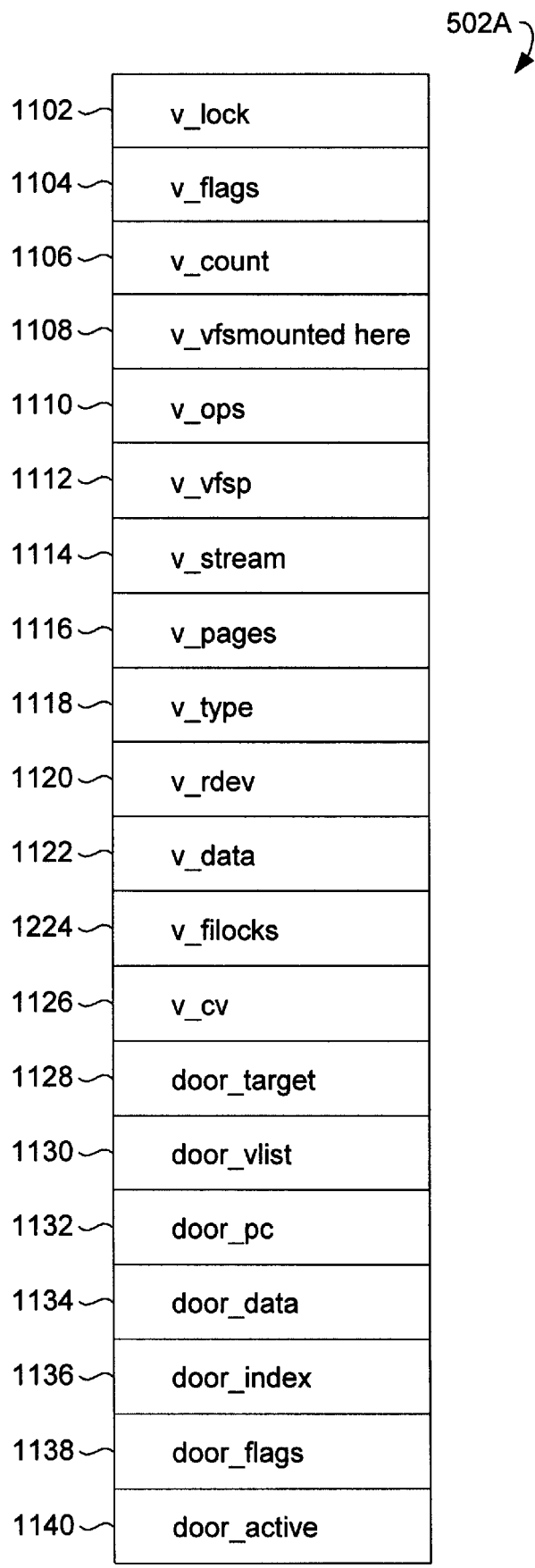
FIG. 11 is a block diagram of a door node in accordance with the present invention.
Figure 13:
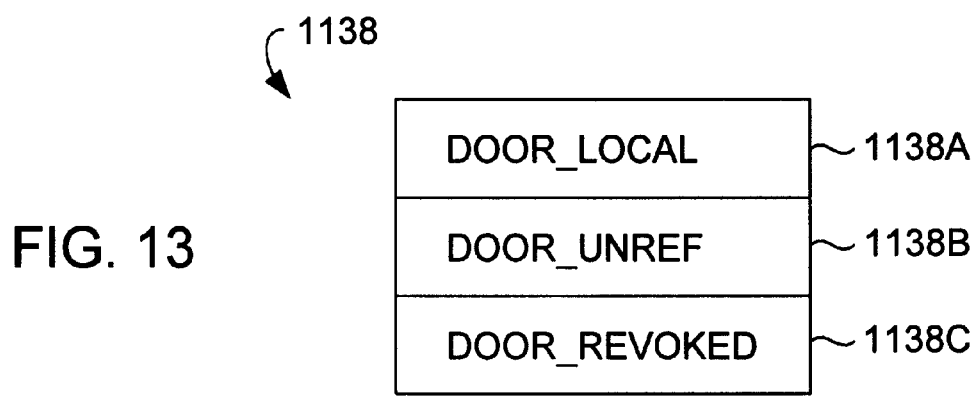
FIG. 13 is a block diagram of door flags of the door node of FIG. 11.

The flags of a door are described below in greater detail as illustrated in FIGS. 11 and 13. In one embodiment, the flags include a flag DOOR_UNREF 1138D (FIG. 13) which is used to indicate whether a particular door invocation is a special door invocation. For example, when no references to a door exist, kernel 102 can cause a special, unreferenced invocation of door 112 which causes termination of server thread 106 to thereby release computer resources allocated to server thread 106.

Procedures are known components of computer programs and are described only briefly for completeness. A procedure is a collection of data and computer instructions which collectively form a component of a computer program. During execution of a computer process containing a procedure, the procedure has a state which is distinct from the remainder of the computer process. One procedure of a computer process can invoke a second procedure, supplying to the second procedure data as arguments and receiving from the second procedure data as results. Data are made available to the second procedure by placing the data on a stack which is part of the state of the computer process as stored in the kernel in a conventional manner.

Figure 5:
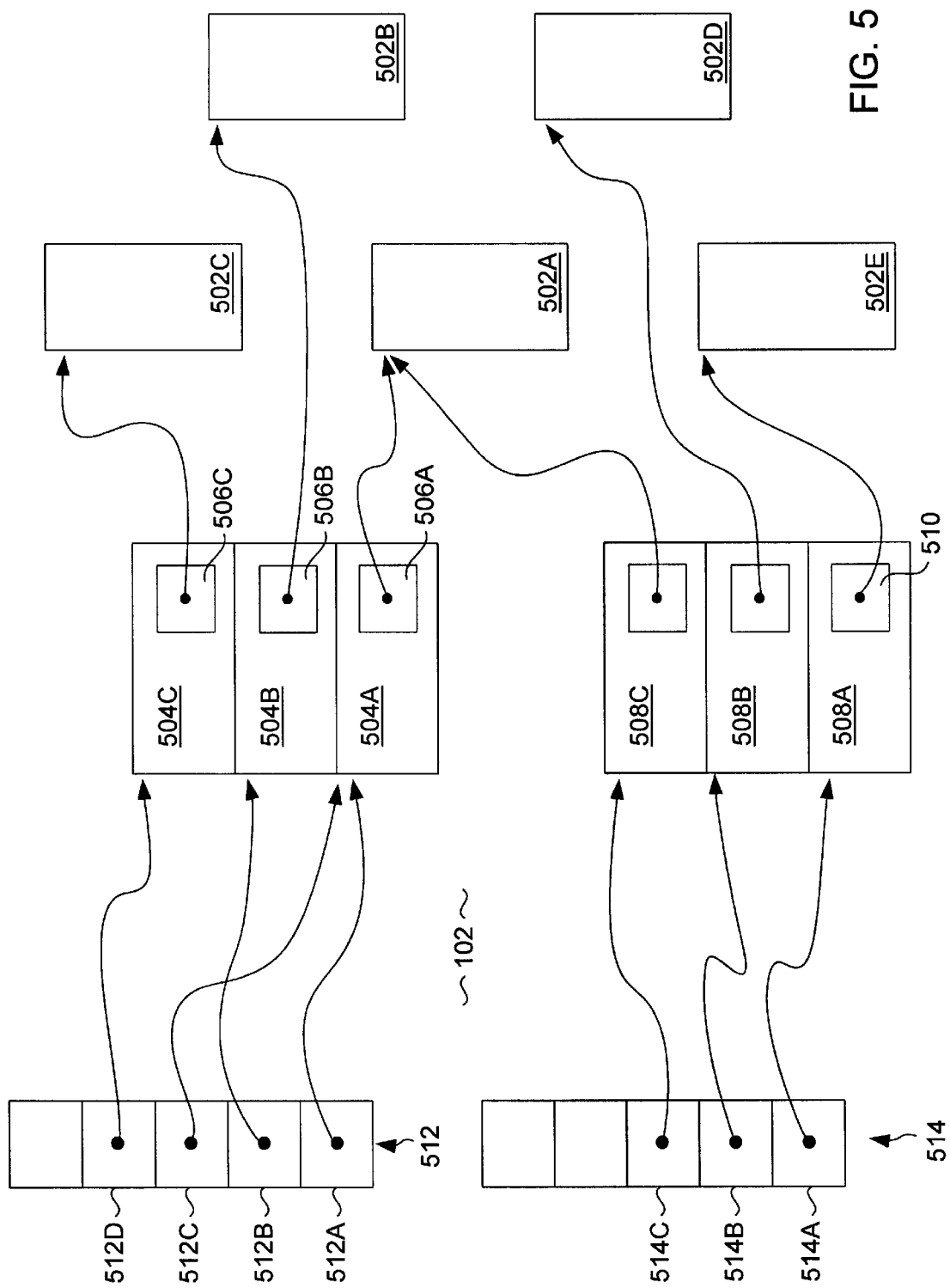
FIG. 5 is a block diagram illustrating the representation of the state of a door in the kernel in accordance with the present invention.

Performance of step 302 (FIG. 3) by thread 108 invokes processing by kernel 102 (FIG. 1) in accordance with logic flow diagram 400 (FIG. 4) in which processing begins with step 402. Logic flow diagram 400 illustrates the creation of door 112 and server thread 106 by kernel 102. In step 402 (FIG. 4), kernel 102 (FIG. 1) creates a vnode to represent door 112. A vnode is a collection of data stored within kernel 102 which represents the state of a particular resource of computer system 200 (FIG. 2), e.g., a file stored on a magnetic or optical storage device of memory 204. Vnodes are known components of the known Solaris and Unix operating systems and are described, for example, by Steven Kleiman in "Vnodes: An Architecture for Multiple File System Types in Sun Unix," *Proceedings of the* 1986 *Summer Unix Conference* at 238–247 (June 1986). FIG. 5 is a block diagram illustrating a data structure within kernel 102 by which vnodes 502A–E represent various resources of computer system 200 (FIG. 2). Each of vnodes 502A–E (FIG. 5) represents a respective resource of computer system 200 (FIG. 2). Vnodes 502A–E are directly analogous to each other and the following description of vnode 502A is equally applicable to each of vnodes 502B–E.

Vnode 502A represents the state of a particular resource to the extent the state of the resource is independent of any thread executing within computer system 200 (FIG. 2). In particular, vnode 502A represents the state of door 112 (FIG. 1) and, in addition to conventional fields of a vnode, includes novel fields to represent components of the state of door 112 which are particular to implementation of doors in operating system 206 (FIG. 2). Vnode 502A is sometimes referred to herein as door node 502A and is shown in greater detail in FIG. 11. As used herein, a door node is a vnode which is adapted to represent the state of a door.

Door node 502A includes (i) a field v_lock 1102, (ii) a field v_flags 1104, (iii) a field v_count 1106, (iv) a field v_vfsmountedhere 1108, (v) a field v_ops 1110, (vi) a field v_vsp 1112, (vii) a field v_stream 1114, (viii) a field v_pages 1116, (ix) a field v_type 1118, (x) a field v_rdev 1120, (xi) a field v_data 1122, (xii) a field v_filocks 1124, and (xiii) a field v_cv 1126. Fields 1102–1126 are conventional and known and are briefly described below. To the extent any of fields 1102–1126 are not described below, fields 1102–1126 are used in a conventional manner to represent respective components of the state of door 112. In addition to fields 1102–1126, door node 502A includes additional fields which are used to represent additional respective components of the state of door 112. Specifically, door node 502A includes (xiv) a field door_target 1128, (xv) a field door_ulist 1130, (xvi) a field door_pc 1132, (xvii) a field door_data 1134, (xviii) a field door_index 1136, (xix) a field door_flags 1138, and (xx) a field door_active 1140. Fields 1128–1140 are novel and are described below in the context of initializing door node 502A to represent door 112. Referring again to logic flow diagram 302 (FIG. 4), kernel 102 (FIG. 1) creates a vnode, e.g., door node 502A (FIG. 11), in step 402 (FIG. 4).

Figure 12:
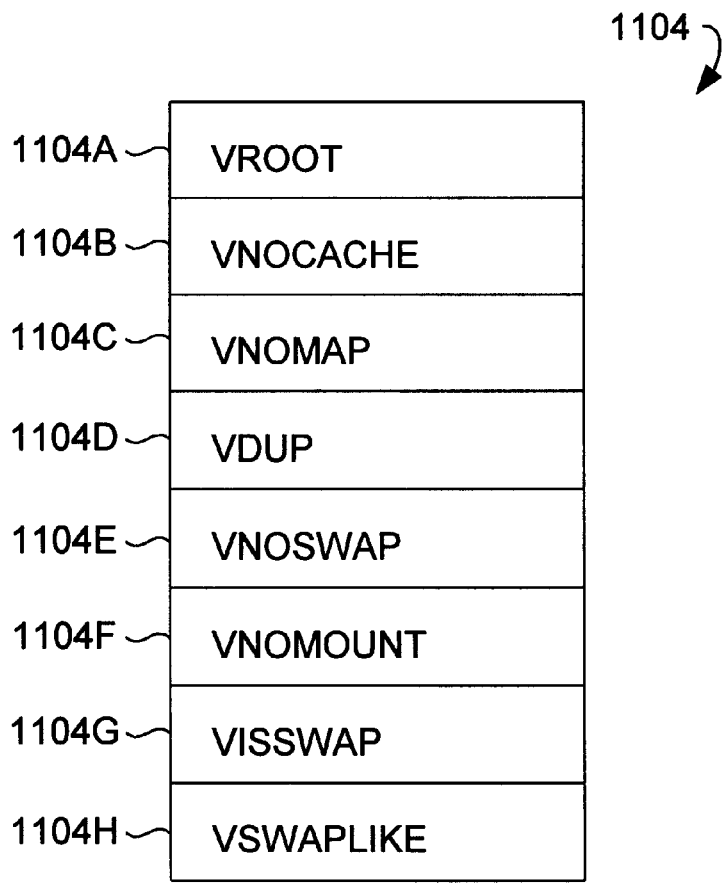
FIG. 12 is a block diagram of vnode flags of the door node of FIG. 11.

From step 402, processing transfers from step 402 to step 404 in which kernel 102 (FIG. 1) initializes door node 502A (FIG. 11) such that door node 502A represents door 112 (FIG. 1). Specifically, kernel 102 stores in field v_flags 1104 of door node 502A (FIG. 11) data representing the various flags of door node 502A in an initial state. Field v_flags 1104 is shown in greater detail in FIG. 12 and includes flags VROOT 1104A, VNOCACHE 1104B, VNOMAP 1104C, VDUP 1104D, VNOSWAP 1104E, VNOMOUNT 1104F, VISSWAP 1104G, and VSWAPLIKE 1104H. Flag VROOT 1104A indicates whether door 112 is the root of its file system and is initialized to indicate that door 112 is not such a root. Flag VNOCACHE 1104B indicates whether door node 502A should not be stored in cache memory (not shown) and is initialized to indicate that door node 502A can be stored in cache memory. Flag VNOMAP 1104D indicates whether door 112 can be mapped or faulted, and is initialized to indicate that door 112 can be mapped and faulted. Flag VDUP 1104D indicates whether door 112 should be duplicated in response to subsequent requests to open door 112, and is initialized to indicate that door 112 should be duplicated rather than subsequently reopened. Flag VNOSWAP 1104E indicates whether door 112 can be used as a virtual swap device and is initialized to indicate that door 112 can be so used. Flag VNOMOUNT 1104F indicates whether door 112 can be covered by a mount operation, and is initialized to indicate the door 112 can be so covered. Mount operations are known components of the known Unix and Solaris operating systems and are not described further herein. Flag VISSWAP 1104G indicates whether door 112 is currently being used for swapping and is initialized to indicate that door 112 is not currently being used for swapping. Flag VSWAPLIKE 1104H indicates whether door 112 can behave like a swap device and is initialized to indicate that door 112 cannot behave like a swap device.

Further in step 404 (FIG. 4), kernel 102 (FIG. 1) stores in field v_count 1106 (FIG. 11) of door node 502A data having an integer value of one to indicate that one descriptor for door 112 currently exists, namely, the descriptor for door 112 that is returned to thread 108 as a result of procedure door_create( ). Field v_count 1106 contains data whose value indicates the number of descriptors for door 112 currently in existence. Each time a descriptor for door 112 is subsequently created, e.g., in response to execution of a procedure open( ) or procedure duplicate( ), the value of the data stored in field v_count 1106 is incremented. Similarly, each time a descriptor for door 112 is subsequently destroyed, e.g., in response to execution of a procedure close( ) or procedure discard( ), the value of the data stored in field v_count 1106 is decremented.

Field v_ops 1108 (FIG. 11) of door node 502A contains a pointer to a collection of methods for various procedures by which kernel 102 maintains resources in response to invocations of the procedures by other computer processes. For example, included in the collection of methods to which field v_ops 1108 points is a method for procedure open( ), by which a computer process, e.g., computer process 104 (FIG. 1), discards a descriptor to door 112. A method is a collection of computer instructions which collectively define the action taken by processor 202 (FIG. 2) when a system procedure corresponding to the method is invoked. For example, when computer process 104 invokes procedure open( ), kernel 102 retrieves through field v_ops 1108 (FIG. 11) the method corresponding to procedure open( ) and performs the computer instructions included therein. However, previous to performance of the method of procedure open( ), kernel 102 first performs a method corresponding to procedure open( ) prior to performance of the method provided through field v_ops 1108. Therefore, kernel 102 performs the same method for each performance of procedure open( ) regardless of the particular type of resource represented by a vnode and then performs any resource-specific method provided through field v_ops of the vnode. To the extent the methods of the collection pointed to by field v_ops 1108 are specifically adapted to process a door such as door 112, the various methods pointed to by field v_ops 1108 are described in greater detail below.

Field v_vfsp 1112 is generally analogous to field v_ops 1108 and contains a pointer to a collection of file system methods for various procedures by which kernel 102 maintains resources in response to invocations of the procedures by other computer processes. For example, included in the collection of methods to which field v_vfsp 1112 points is a method for procedures mount( ) and unmount( ). Previous to performance of a method of the collection pointed to by field v_vfsp 1112, kernel 102 first performs a method corresponding to the file system procedure prior to performance of the method provided through field v_vfsp 1112. Therefore, kernel 102 performs the same method for each performance of a file system procedure regardless of the particular type of resource represented by a vnode and then performs any resource-specific file system method provided through field v_vfsp of the vnode. To the extent the file system methods of the collection pointed to by field v_vfsp 1112 are specifically adapted to process a door such as door 112, the various file system methods pointed to by field v_vfsp 1112 are described in greater detail below.

Fields v_stream 1114, v_pages 1116, v_rdev 1120, v_filocks 1122, and v_cv 1126 are not used in representing door 112 and are initialized to be null. Field v_type 1118 of door node 502A contains data which in turn indicate the type of resource of door 112 and initialized to a type identifier which identifies door 112 as a door. Field v_data 1122 is a pointer to a buffer of data which is specific to the particular type of resource represented by a vnode such as door node 502A. Field v_data 1122 contains a pointer to vnode 502A.

Field door_target 1128 contains a pointer to the computer process which is responsible for carrying out invocations of door 112 and is initialized to identify the computer process invoking performance of procedure door_create( ) to create door 112, i.e., computer process 110. It is the responsibility of computer process 110 to provide server threads, e.g., server thread 106, for carrying out invocations of door 112.

Field door_ulist 1130 contains a pointer to a linked list of pending unreferenced invocations of all doors created by computer process 110 (FIG. 1) and is initialized to NULL to indicate that no unreferenced invocations of any door created by computer process 110 are pending. Unreferenced invocations of door 112 and use of field door_ulist 1130 (FIG. 11) are described more completely below.

Field door_pc 1132 is a pointer to subject procedure 106P (FIG. 1) and therefore identifies subject procedure 106P as the procedure to be executed by server thread 106 in response to an invocation of door 112. It should be noted that, at the time door 112 is created, server thread 106 does not yet exist. However, when thread 108 subsequently creates server thread 106, server thread 106 is an identical copy of thread 108. Therefore, thread 108 must contain a copy of subject procedure 106P. When server thread 106 is subsequently created, thread 108 and server thread 106 differ only in their respective execution states such that each can identify itself as the original thread, i.e., thread 108, or the newly created thread, i.e., server thread 106. Thread 108 is configured to never execute subject procedure 106P, and server thread 106 is configured to execute subject procedure 106P in response to invocations of door 112 as described in greater detail below.

Field door_data 1134 (FIG. 11) is a pointer to a door data structure 800 (FIG. 8) which is described in greater detail below and through which data is passed between a client computer process, e.g., computer process 104 (FIG. 1), and server thread 106 in a manner described more completely below. Field door_index 1136 (FIG. 11) contains data which uniquely identifies door 112 from all other doors which are created by kernel 102 (FIG. 1) and which currently exist.

Field door_flags 1138 (FIG. 11) includes a number of flags which represent respective components of the state of door 112 (FIG. 1) and is shown in greater detail in FIG. 13. Field door_flags 1138 includes flags DOOR_LOCAL 1138A, DOOR_UNREF 1138B, and DOOR_REVOKED 1138C. The particular settings of the flags of field door_flags 1138 is provided by thread 108 (FIG. 1) when requesting that kernel 102 create door 112 by invocation of procedure door_create( ). Flag DOOR_LOCAL 1138A (FIG. 13) indicates whether the descriptor returned to thread 108 (FIG. 1) as a result of execution by kernel 102 of procedure door_create( ) is local to the current process, i.e., to computer process 110. A descriptor is local to a particular computer process if the descriptor refers to a door created by the particular computer process. For example, flag DOOR_LOCAL 1138A indicates that the descriptor returned to thread 108 is local. Conversely, if door_node 502A corresponds to a descriptor returned by invocation of procedure open( ) by computer process 104, flag DOOR_LOCAL 1138A indicates that the returned descriptor is not local. When a descriptor is local, invocations of a door using procedure door_call( ) as described more completely below are unnecessary since the subject procedure is within the address space of the calling computer process.

Flag DOOR_UNREF 1138B (FIG. 13) indicates whether the discarding of the last reference to door 112 by a client process, e.g., computer process 104, causes an unreferenced invocation of door 112. Flag DOOR_UNREF 1138B is initialized to a value provided by computer process 110 in creating door 112. When the last reference held by a client process is discarded, e.g., through invocation of procedure close( ), kernel 102 checks flag DOOR_UNREF 1138B and, if set, kernel 102 issues an unreferenced invocation of door 112. As described more completely below, kernel 102 issues an unreferenced invocation of door 112 to indicate to computer process 110, e.g., through server thread 106, that no client processes currently have a reference to door 112. Computer process 110 can then destroy door 112 if computer process 110 is so configured since no client processes can invoke door 112.

Flag DOOR_REVOKED 1138C (FIG. 13) indicates whether computer process 110, i.e., the computer process which created door 112, has revoked door 112 and is initialized to indicate that door 112 has not been revoked. When door 112 is revoked by computer process 110, subsequent invocations are not serviced by server thread 106 and an error is returned to the computer process invoking door 112.

Field door_active 1140 (FIG. 11) of door node 502A contains data whose value indicates the number of currently active invocations of door 112 (FIG. 1) and initially contains data whose value is zero. The value of the data stored in field door_active 1140 (FIG. 11) is incremented each time door 112 (FIG. 1) is invoked by execution of procedure door_call( ) and is decremented each time an invocation of door 112 completes by execution of procedure door_return( ).

Thus, in step 404 (FIG. 4), door node 502A (FIG. 11) is initialized to represent the state of door 112 (FIG. 1).

From step 404 (FIG. 4), processing transfers to step 406 in which kernel 102 (FIG. 1) allocates a file structure which represents the state of door 112 in the context of thread 108 of computer process 110, i.e., the thread creating door 112. A file structure, e.g., file structure 504A (FIG. 5), represents the state of a resource of computer system 200 (FIG. 2) in the context of a particular computer process, e.g., computer process 110 (FIG. 1). File structures representing respective states of respective resources within the context of a single computer process are grouped within kernel 102 into a collection 504 (FIG. 5). For example, file structures 504A–C of collection 504 represent respective states of respective resources within the context of computer process 110 (FIG. 1) and are therefore grouped. File structures are known components of known operating systems such as the Unix and Solaris operating systems. However, file structures are described here briefly for completeness.

File structures 504A–C (FIG. 5) and 508A–C are directly analogous to one another. Therefore, the following description of file structure 504A is equally applicable to file structures 504B–C and 508A–C. Since file structure 504A represents a state of a resource, file structure 504A includes a pointer 506 to door node 502A which represents the states of the resource, e.g., door 112 (FIG. 1), independent of any particular computer process of computer system 200 (FIG. 2). All state information of the resource which is specific to a particular computer process, e.g., computer process 110 (FIG. 1), is stored in file structure 504A (FIG. 5). Such information includes (i) a current file offset which defines the particular position within the resource which is next accessed, (ii) an access mode which indicates whether data is currently being read from or written to the resource, and (iii) flags which specify various characteristics of the access of the resource by the particular computer process. Such flags include (i) whether data written to the resource is appended to any data already stored in the resource, (ii) whether a read operation waits for data or completes immediately when no data is available to be read, and (iii) whether the resource is to be closed when the particular computer process is bifurcated into two or more separate computer processes.

Kernel 102 (FIG. 1) allocates file structure 504A (FIG. 5) by allocating sufficient memory within kernel 102 for storage of file structure 504A and stores in the allocated memory data representing an initial state of the resource, e.g., door 112 (FIG. 1), in the context of computer process 110. In one embodiment, kernel 102 allocates a file structure by execution of the known system procedure "falloc( )" of the known Solaris and Unix operating systems.

Processing transfers from step 406 (FIG. 4) to step 408 in which kernel 102 (FIG. 1) binds door 112 to the allocated file structure, e.g., file structure 504A (FIG. 5). By binding door 112 to file structure 504A, kernel 102 enables use of existing and known file structure management mechanisms for management of door 112 in a novel and non-obvious manner. Step 408 (FIG. 4) is shown in greater detail as logic flow diagram 408 (FIG. 6). Processing begins in step 602 in which kernel 102 (FIG. 1) allocates a file descriptor, e.g., file descriptor 512A (FIG. 5), to computer process 110 (FIG. 1). File descriptors are known components of the Unix and Solaris operating systems and are described briefly below for completeness. Processing transfers to step 604 (FIG. 6) in which kernel 102 (FIG. 1) associates the file descriptor with file structure 504A (FIG. 5) which is allocated in step 406 (FIG. 4).

Kernel 102 (FIG. 1) includes and associates which each computer process, e.g., computer process 110, an array of file descriptors, e.g., file descriptor array 512 (FIG. 5). Each item of file descriptor array 512 is a file descriptor which references a particular file structure in a collection of file structures associated with the thread. For example, computer process 110 is associate with the file descriptor array 512 which includes file descriptor 512A which in turn references file structure 504A which in turn represents the state of door 112 (FIG. 1) in the context of computer process 110. More specifically, file descriptor 512A (FIG. 5) of file descriptor array 512, which is associated within kernel 102 (FIG. 1) with computer process 110, references file structure 504A which is also associated within kernel 102 with computer process 110. File structure 504A represents the portion of the state of door 112 which is specific to computer process 110 and includes a reference 506A to vnode 502A. As described above, vnode 502A is a door node and represents the portion of the state of door 112 which is independent of any particular computer process. Therefore, file descriptor 512A of computer process 110 specifies door 112, including the state of door 112 in the context of computer process 110.

Once kernel 102 creates door 112 and represents door 112 with door node 502A (FIG. 5), data structure 504A, and file descriptor 512A, thread 108 (FIG. 1) can manipulate and manage door 112 using conventional mechanisms provided by the Unix and Solaris operating systems. For example, thread 108 assigns to door 112 a well-publicized name as described above. In particular, thread 108 assigns a name to door 112 using the known procedure "fattach( )" of the known Unix and Solaris operating systems. In invoking procedure fattach( ), thread 108 supplies to kernel 102 a name to be assigned to door 112 and file descriptor 512A (FIG. 5) since file descriptor 512A references file structure 504A which in turn represents the state of door 112 (FIG. 1). In response, kernel 102 retrieves door node 502A (FIG. 5), which represents the state of door 112 (FIG. 1) independently of any particular thread and which is referenced by pointer 506A (FIG. 5) of file structure 504A as described above. Kernel 102 then associates door node 502A with the name supplied by thread 108 (FIG. 1) in a database (not shown) in kernel 102 using the known procedure "mount( )" of the Unix and Solaris operating systems. Since door 112 is accurately and completely represented using novel adaptations of conventional data structures, including door node 502A (FIG. 5) and file structure 504A, the assignment of a name to door 112 (FIG. 1) using procedure fattach( ) is accomplished without any modification to procedure fattach( ) as carried out by kernel 102, thereby requiring less work by software engineers developing and implementing doors in existing operating systems such as the Unix and Solaris operating systems.

As described above, the name assigned to door 112 is well-publicized and made known to software engineers developing and implementing client computer processes such as computer process 104. Prior to invoking door 112, computer process 104 opens door 112 in the manner that computer process 104 would open a file, i.e., by invocation of procedure open( ) of the known Unix or Solaris operating systems. In the context of doors, procedure open( ) is described below in greater detail. Briefly, computer process 104 supplies to kernel 102 the name by which door 112 is known and receives from kernel 102 a file descriptor, e.g., file descriptor 514C (FIG. 5). Kernel 102 (i) determines that the supplied name is associated with door node 502A, (ii) creates a file structure 508C which represents an initial state of door 112 (FIG. 1) in the context of computer process 104, and (iii) creates and returns to computer process 104 file descriptor 514C (FIG. 5) which references file structure 508C. Thus, software engineers developing and implementing computer process 106 (FIG. 1) obtain access to door 112 using familiar mechanisms of the Unix and Solaris operating systems made possible by the novel implementation of doors in the file systems management mechanisms of the operating system.

Following step 604 (FIG. 6), processing according to logic flow diagram 408, and therefore step 408 (FIG. 4), terminates. From step 408, processing transfers to step 410 in which kernel 102 (FIG. 1) creates server thread 106 of computer process 110 and initializes server thread 106 so that server thread 106 is ready to perform the subject procedure of door 112 in response to invocations of door 112. Kernel 102 initializes server thread 106 by performance of procedure door_return( ), which is described more completely below and which places server thread 106 in a state in which server thread 106 waits idly until server thread 106 next performs the subject procedure of door 112 in response to an invocation of door 112. After step 410, creation of door 112 by kernel 102 in accordance with logic flow diagram 302, and therefore step 302 (FIG. 3), terminates.

Invocation of a Door

Figure 7:
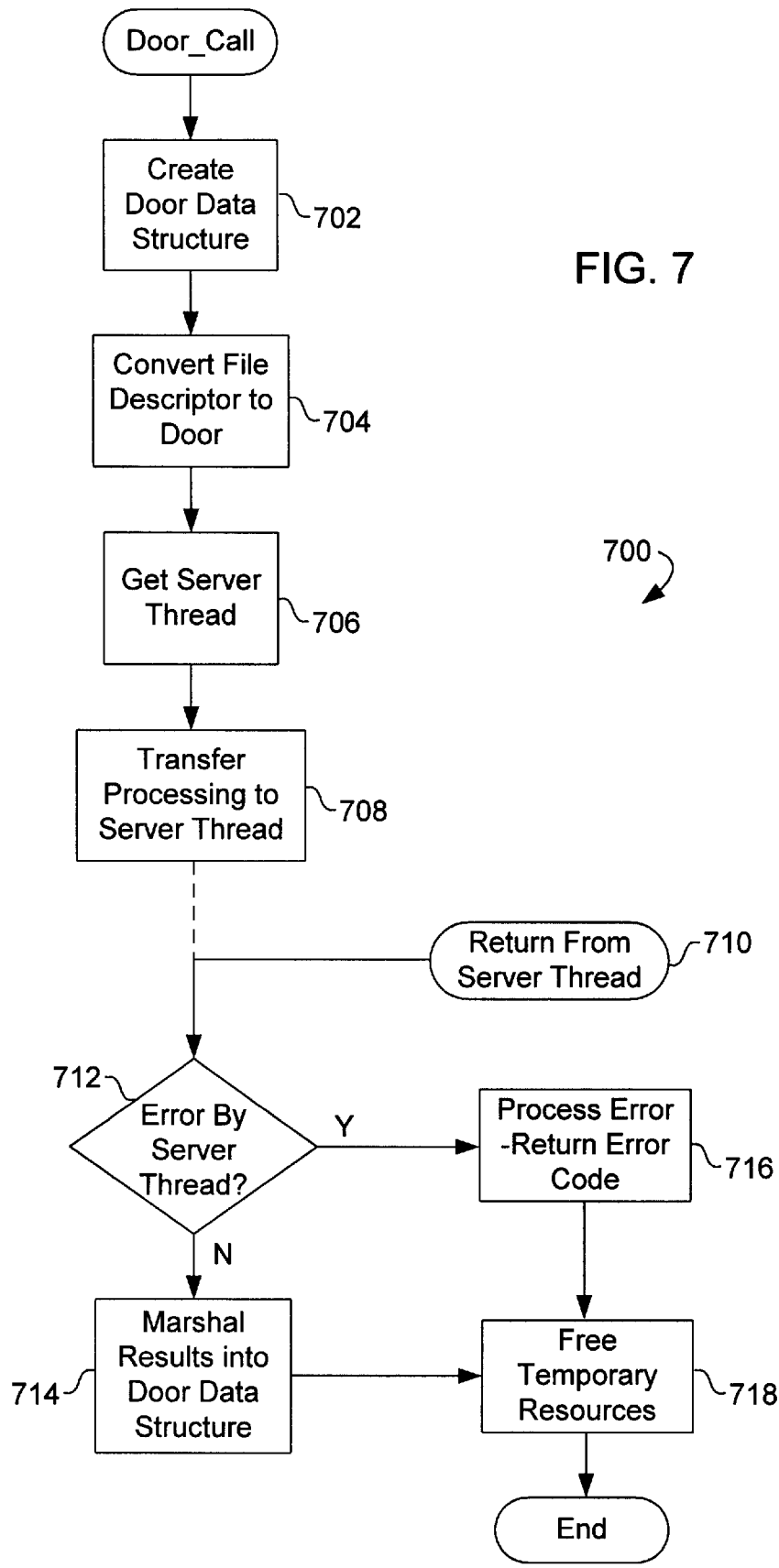
FIG. 7 is a logic flow diagram of the invocation of a door in accordance with the present invention.

As described above, computer process 104 invokes door 112 in step 312 (FIG. 3) and resumes execution after completion of processing of door 112 at step 326. Flow diagram 700 (FIG. 7) represents the processing performed by kernel 102 on behalf of computer process 104 in response to steps 312 (FIG. 3) and 326. As shown in FIG. 7, performance of step 312 by computer process 104 causes kernel 102 to perform steps 702–708, and performance of step 326 by computer process 104 causes kernel 102 to perform steps 710–718. Computer process 104 invokes door 112 by calling a procedure "door_call( )" in which computer process 104 supplies to kernel 102 (i) file descriptor 514C (FIG. 5), which corresponds to door 112 as described above, and (ii) a door data structure 800 (FIG. 8), which includes information to be passed through door 112 to server process 106.

Door data structure 800 (FIG. 8) includes a door data buffer 802 which in turn includes a data portion 802A and a descriptors portion 802B. Data portion 802A includes data which are marshaled into data portion 802A by computer process 104 and marshaled out of data portion 802A by server thread 106. Thus, computer process 104 passes data to server thread 106 by including the data in data portion 802A of door data structure 802. Descriptor portion 802B includes zero or more file descriptors. Since file descriptors are specific to a particular computer process, e.g., computer process 104, kernel 102 passes file descriptors from computer process 104 to server thread 106 by creating in server thread 106 new file descriptors and associates with the new file descriptors copies of the file structures referenced by the descriptors in descriptor portion 802B.

Suppose for example that computer process 104 includes in descriptor portion 802B file descriptor 514B (FIG. 5) which references file structure 508B which in turn references vnode 502D. Upon invocation of door 112 by computer process 104, kernel 102 (i) creates a new file descriptor 512E (FIG. 9) for server thread 106 and (ii) copies file structure 508B to form file structure 508B2 and includes file structure 508B2 in the group of file structures associated with server thread 106. Since file structure 508B references vnode 502D, file structure 508B2, which is a copy of file structure 508B, also references vnode 502D. Thus, by inclusion of a file descriptor in descriptor portion 802B (FIG. 8), an equivalent file descriptor is created in server thread 106 upon invocation of door 112.

Door data structure 800 includes (i) a pointer 804 to door data buffer 802, (ii) an integer 806 indicating the size of data portion 802A, and (iii) an integer 808 indicating the number of file descriptors included in descriptor portion 802B. Upon successful creation of door data structure 800 in step 702 (FIG. 7), processing transfers to step 704 in which kernel 102 (FIG. 1) retrieves the door, e.g., door 112, referenced by the file descriptor supplied by computer process 104 in step 312 (FIG. 3). Specifically, kernel 102 (FIG. 1) retrieves the file structure, e.g., file structure 508C (FIG. 5), referenced by file descriptor 514C and retrieves the vnode, e.g., door node 502A, referenced by the retrieved file structure. Kernel 102 (FIG. 1) verifies that the retrieved vnode represents a door and indicates to computer process 104 that invocation of the door was unsuccessful if the retrieved vnode does not represent a door.

Figure 10A:
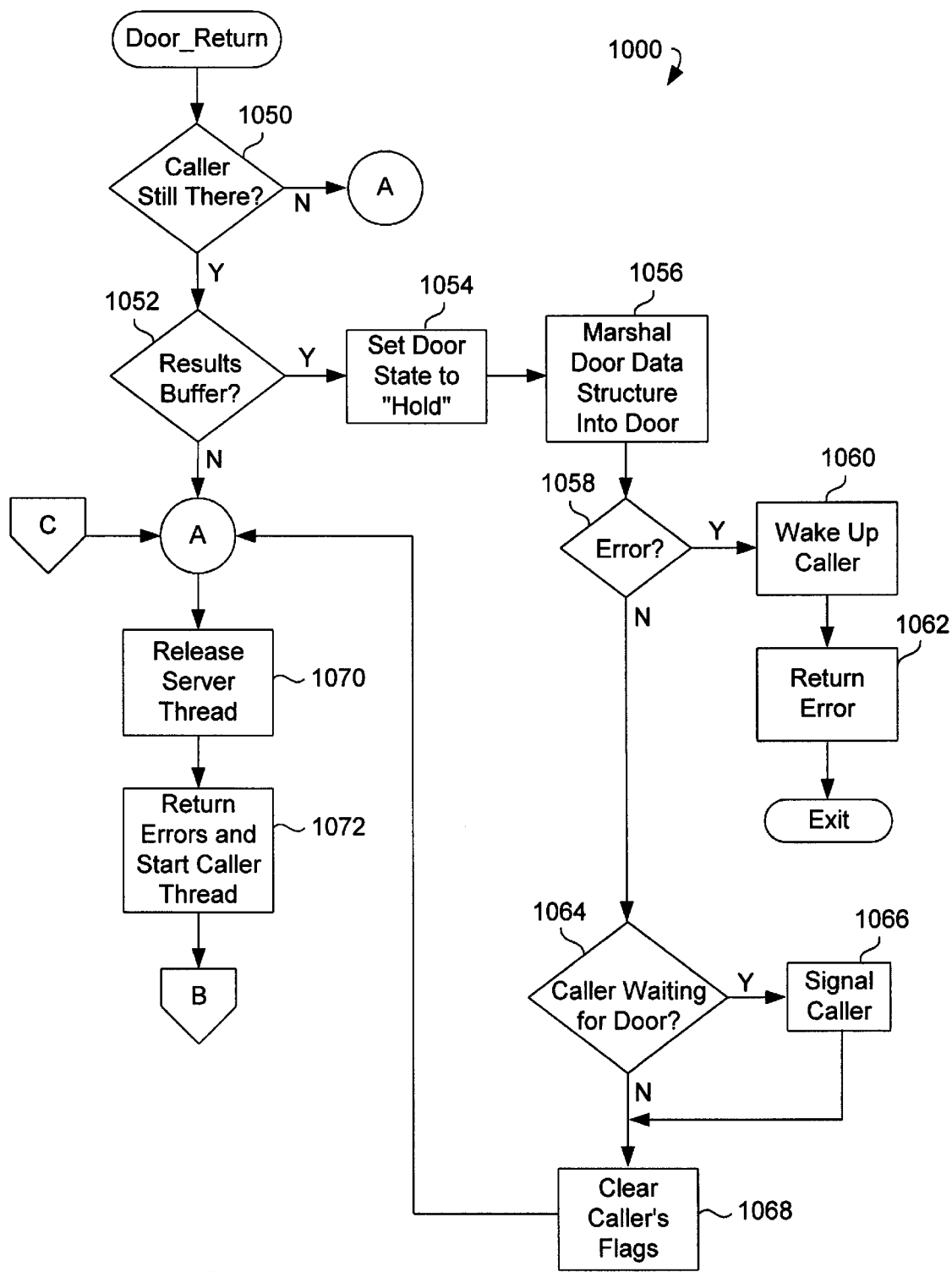
FIGS. 10A and 10B are a logic flow diagram which illustrates the processing of a door by a server thread.
Figure 10B:
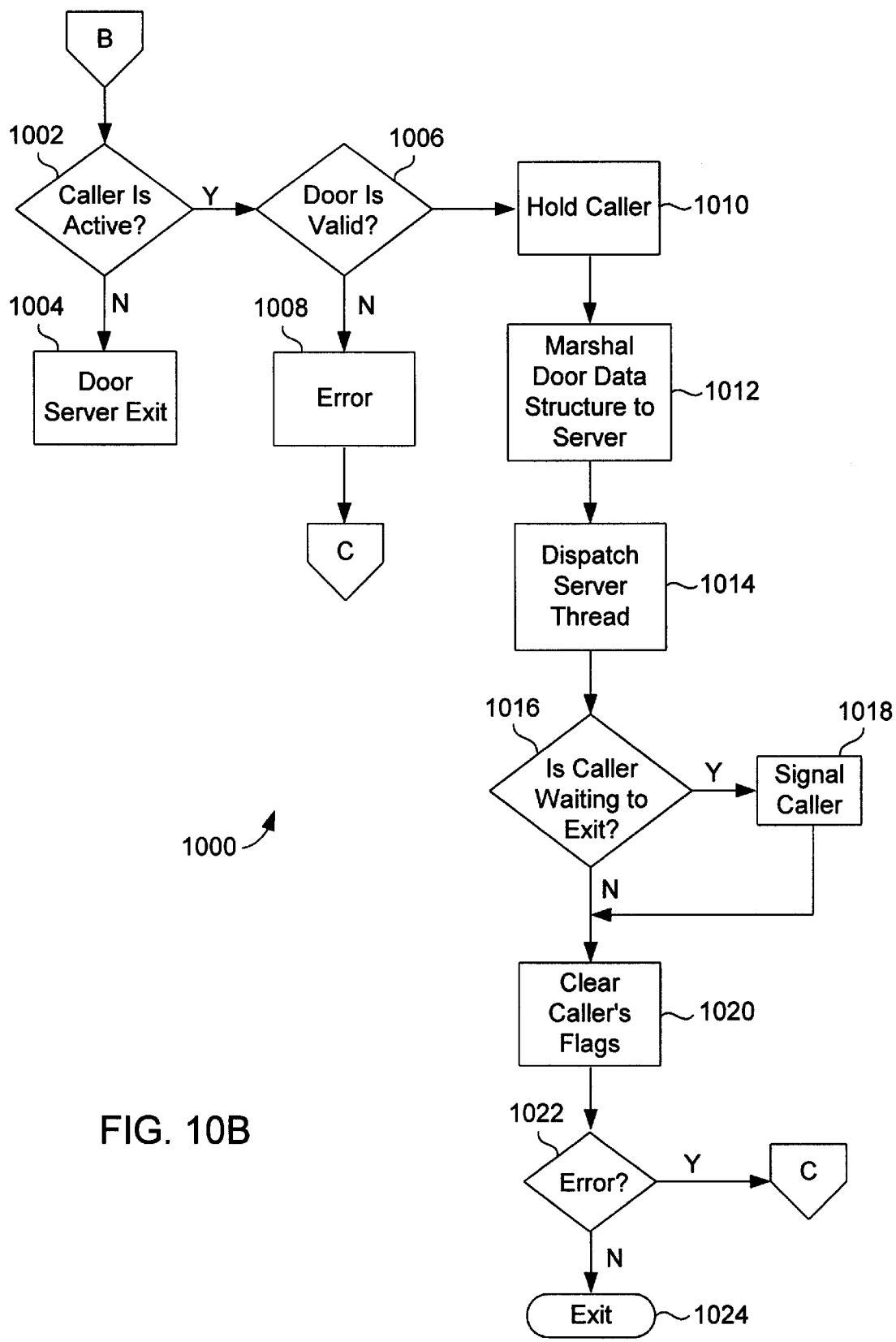

Processing transfers from step 704 (FIG. 7) to step 706 in which kernel 102 (FIG. 1) locates an available server thread, e.g., server thread 106. Kernel 102 maintains a linked list of references to available server threads for each door. In step 706 (FIG. 7), kernel 102 (FIG. 1) selects any of the references to server threads from the linked list of available server threads for door 112, e.g., server thread 106, and removes the selected reference from the list. From step 706 (FIG. 7), processing transfers to step 708 in which kernel 102 (FIG. 1) suspends processing according to logic flow diagram on behalf of computer process 104 and resumes processing on behalf of server thread 106 according to logic flow diagram 1000 (FIGS. 10A and 10B).

Shuttle 114 (FIG. 1) resumes processing on behalf of server thread 106 at test step 1002 (FIG. 10B) of logic flow diagram 1000. When server thread 106 has completed execution of subject procedure 106P during a previous invocation of door 112, server thread 106 invokes a procedure "door_return( )" which is executed by kernel 102 according to logic flow diagram 1000 (FIGS. 10A and 10B). Kernel 102 (FIG. 1) performs procedure door_return( ) when invoked by server thread 106 or when initializing server thread 106 in step 412 (FIG. 4) as described above. Within procedure door_return( ), and specifically immediately prior to execution of test step 1002 (FIG. 10B), shuttle 114 (FIG. 1) of kernel 102 suspends processing of kernel 102 according to logic flow diagram 1000 (FIGS. 10A and 10B) on behalf of server thread 106 and resumes processing of kernel 102 (FIG. 1) according to logic flow diagram 700 (FIG. 7) on behalf of a client process, e.g., computer process 104 (FIG. 1), which ultimately resumes execution of the client process as described more completely below.

A client process, e.g., computer process 104, invokes door 112 by invoking procedure door_call( ), which is performed by kernel 102 according to logic flow diagram 700 (FIG. 7) and during which execution of the client process is suspended. Performance of step 708 by kernel 102 (FIG. 1) suspends processing according to logic flow diagram 700 (FIG. 7) on behalf of the client process and resumes processing of kernel 102 (FIG. 1) according to logic flow diagram 1000 (FIGS. 10A and 10B) at step 1002 (FIG. 10B). Since processing on behalf of the client process, e.g., computer process 104, according to logic flow diagram 700 (FIG. 7) is suspended, execution of the client process remains suspended until processing by kernel 102 (FIG. 1) according to logic flow diagram 700 (FIG. 7) resumes and completes. From the perspective of server thread 106 (FIG. 1), processing in response to invocation of door 112 terminates by invocation of procedure door_return( ) and procedure door_return( ) terminates by a subsequent invocation of door 112.

In test step 1002 (FIG. 10B), kernel 102 (FIG. 1) determines whether the client process invoking door 112, e.g., computer process 104, is active. If the client process is not active, the client process has terminated execution without waiting for results from invocation of door 112 or, alternatively, kernel 102 has resumed execution of server thread 106 for a reason other than invocation of door 112 by a client process. Since kernel 102 is responsible for controlling and scheduling computer processes executing within computer system 200 (FIG. 2), kernel 102 (FIG. 1) includes process state information which records the state of each computer process executing within computer system 200 (FIG. 2). The management of computer processes executing within computer system 200 by kernel 102 (FIG. 1) and the information stored within kernel 102 for such management is conventional and known and is not described further herein. Kernel 102 determines whether computer process 104 is active by comparison of the process state information of computer process 104 to data indicating that a computer process is active.

If computer process 104 is not active, kernel 102 has resumed execution of server thread 106 for some reason other than invocation of door 112 and processing transfers from test step 1002 (FIG. 10B) to step 1004 in which kernel 102 (FIG. 1) (i) removes server thread 106 from the linked list of available server threads for door 112, (ii) determines the reason for resumption of execution of server thread 106, and (iii) takes appropriate action based on the particular reason. For example, kernel 102 determines whether server thread 106 is signaled or is in a hold state and, if so, causes procedure door_return( ) to terminate in error, returning to server thread 106 data identifying the error. Server thread 102 can be signaled by another computer process using condition variables and known techniques. Server thread 102 can be placed in a hold state by another computer process, such as a debugger, for example, so that the state of server thread 106 can be examined and analyzed. If server thread 106 is not signaled or in a hold state, kernel 102 causes procedure door_return( ) to terminate normally, i.e., without error. In either case, server thread 106 typically invokes procedure door_return( ) substantially immediately thereafter to return server thread 106 to a state in which server thread 106 is ready to serve an invocation of door 112. Conversely, if computer process 104 is active, processing transfers from test step 1002 (FIG. 10B) to test step 1006.

In test step 1006, kernel 102 (FIG. 1) determines whether door 112 is valid, i.e., not revoked. Door 112 is revoked if computer process 110 has revoked door 112 or has terminated processing. Computer process 110, e.g., thread 108 of computer process 110, can revoke door 112 by invoking a procedure door_revoke( ) in which kernel 102 receives a door descriptor from computer process 110 and sets flag DOOR_REVOKED 1138C (FIG. 13) in field door_flags 1138 (FIG. 11) of door node 502A to indicate that door 112 (FIG. 1) is revoked. In addition, upon termination of processing of computer process 110, kernel 102 sets flag DOOR_REVOKED 1138C (FIG. 13) in field door_flags of door node 502A (FIG. 11) to indicate that door 112 (FIG. 1) is revoked. By determining the state of flag DOOR_REVOKED 1138C (FIG. 13), kernel 102 (FIG. 1) determines whether door 112 is revoked. If door 112 is revoked, processing transfers from test step 1006 (FIG. 10B) to step 1008 in which kernel 102 (FIG. 1) sets an error flag in the state of server thread 106 to indicate that an error has occurred and processing transfers to step 1070 (FIG. 10A) which is described more completely below. Conversely, if door 112 (FIG. 1) is valid, processing transfers from test step 1006 (FIG. 10B) to step 1010.

In step 1010, kernel 102 (FIG. 1) suspends execution of computer process 104 by placing computer process 104 in a hold state to allow server thread 106 to unmarshal arguments from door 112. By placing computer process 104 in a hold state, termination of processing of computer process 104 is prevented. For example, if computer process 104 has multiple threads, only one of which is waiting for server thread 106 to perform the subject procedure of door 112, a different thread of computer process 104 can cause processing of computer process 104, and therefore all threads of computer process 104, to terminate. If computer process 104 terminates while a thread of computer process 104 is waiting for server thread 106 and therefore has access to a portion of memory allocated to server thread 106, the memory of server thread 106 to which computer process 104 has access is reclaimed by kernel 102 and marked as free and available to be allocated to other computer processes. The result is substantial instability in computer process 110 as a portion of the memory of server thread 106 is suddenly no longer available to server thread 106.

Figure 8:
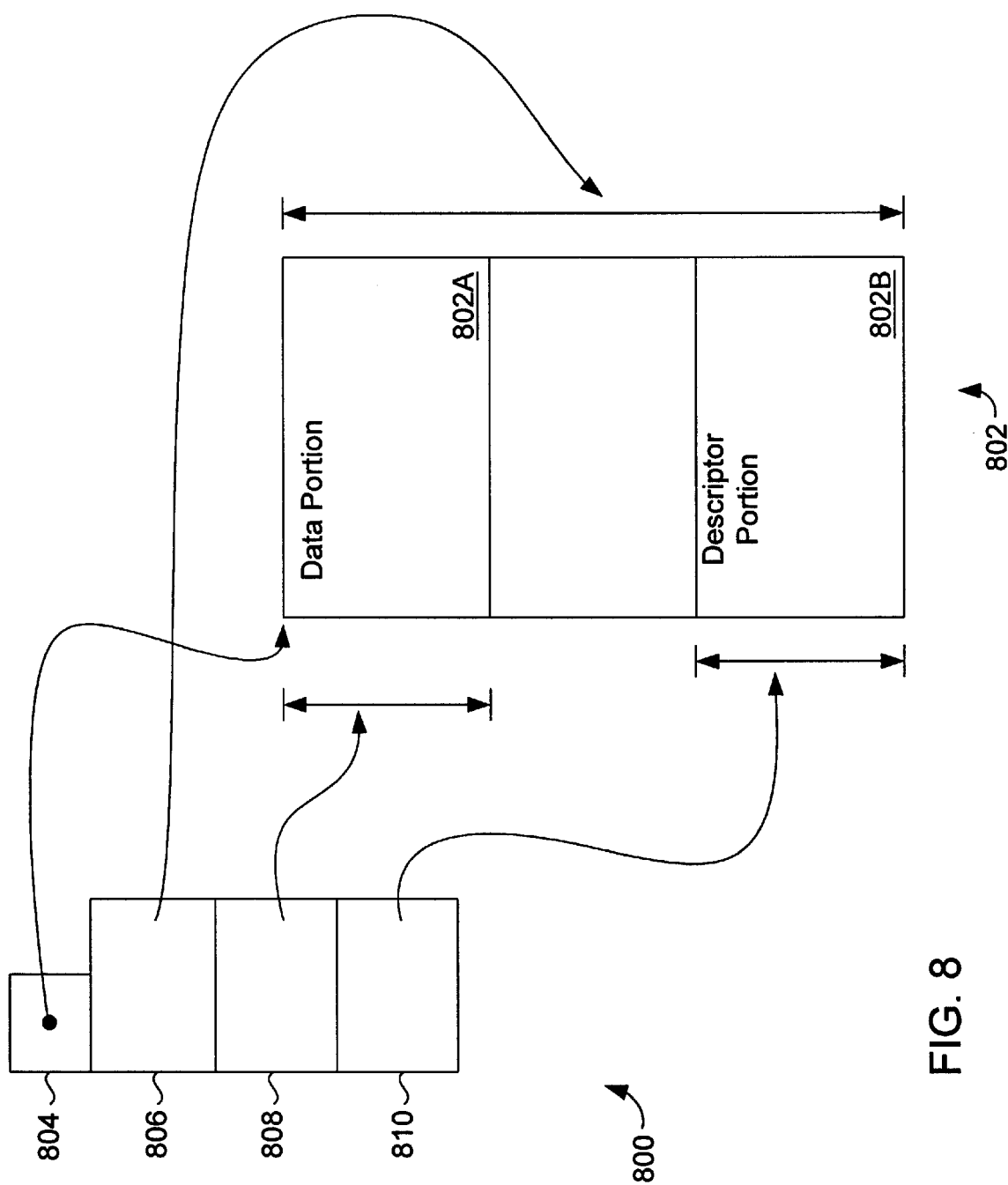
FIG. 8 is a block diagram of a door data structure.
Figure 9:
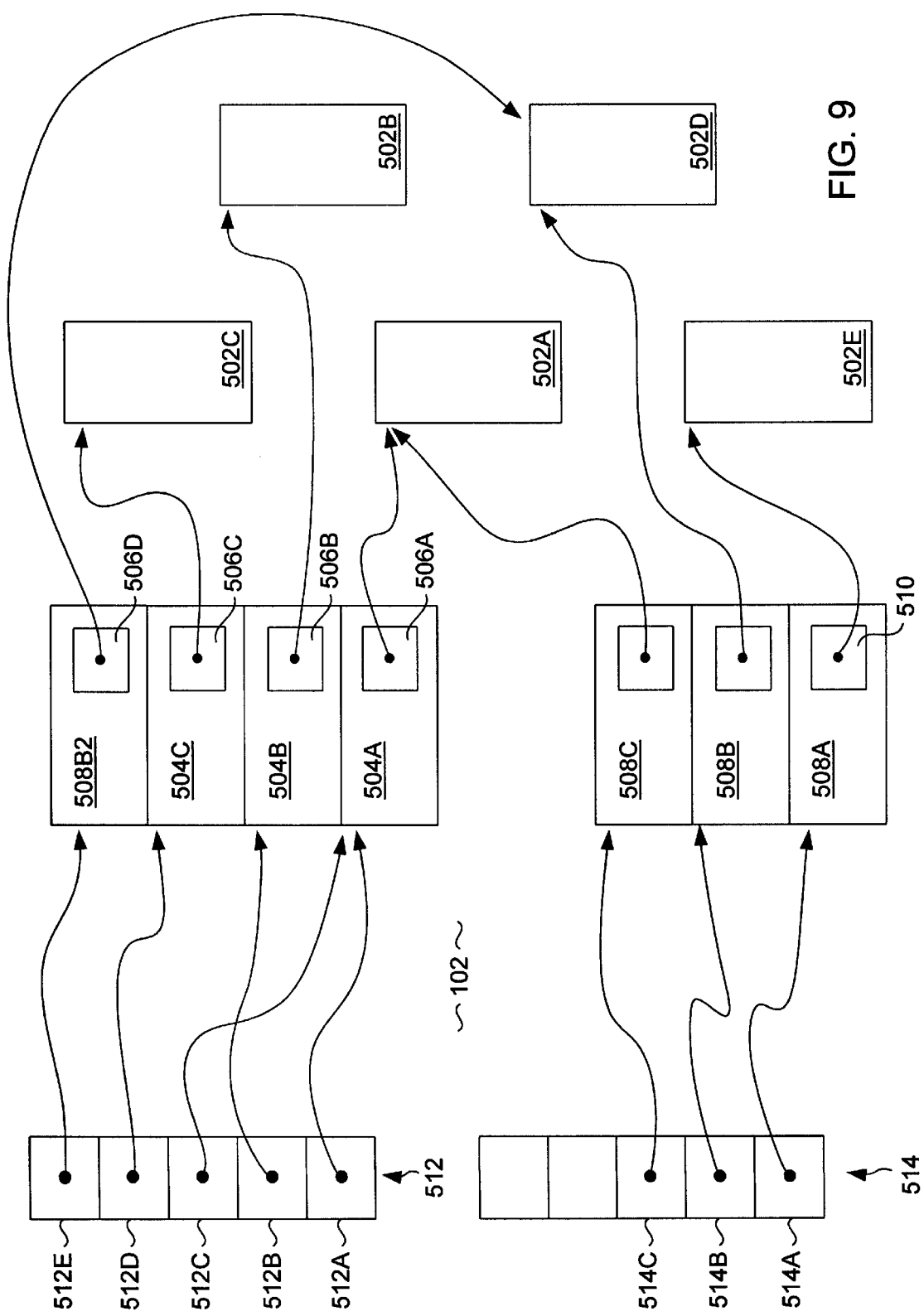
FIG. 9 is a block diagram illustrating the passing of a descriptor from a client process to a server process in accordance with the present invention.

Kernel 102 places computer process 104 in the hold state by storing in the process state information within kernel 102 representing the state of computer process 104 data indicating that computer process 104 is in the hold state. While in the hold state, execution of computer process 104 is suspended. Processing transfers to step 1012 (FIG. 10B) in which kernel 102 (FIG. 1) marshals door data structure 800 (FIG. 8) from door 112 (FIG. 1) to a portion of memory 204 (FIG. 2) accessible to server thread 106 (FIG. 1). Specifically, kernel 102 marshals door data structure 800 (FIG. 8) from door 112 (FIG. 1) to the stack of server thread 106 such that the subject procedure of door 112, which is a component of server thread 106 as described above, retrieves door data structure 800 (FIG. 8) from the stack of server thread 106 (FIG. 1) in the manner arguments would be retrieved from the stack of server thread 106 had the subject procedure been invoked by another procedure of server thread 106. Accordingly, a software engineer developing and implementing server thread 106 uses conventional and familiar techniques to retrieve door data structure 800 (FIG. 8). From step 1012 (FIG. 10B), processing transfers to step 1014 in which kernel 102 (FIG. 1) resumes execution of server thread 106 at the address within server thread 106 of subject procedure 106P as contained in field door_pc 1132 (FIG. 11) of door node 502A which represents door 112 (FIG. 1). In resuming execution of server thread 106, kernel 102 stores as the program counter of server thread 106 the address within server thread 106 of subject procedure 106P as retrieved from field door_pc 1132 (FIG. 11) such that execution of server thread 106 (FIG. 1) begins at the first computer instruction of subject procedure 106P. Since the arguments are marshaled onto the stack of server thread 106 as described above, server thread 106 resumes execution in a state which is functionally equivalent to the state generated when subject procedure 106P is invoked by a computer instruction internal to server thread 106.

In test step 1016 (FIG. 10B), to which processing transfers from step 1014, kernel 102 (FIG. 1) determines whether the client computer process, e.g., computer process 104, is waiting to terminate execution. Kernel 102 determines whether computer process 104 is waiting to terminate execution by comparison of process state information representing within kernel 102 the state of computer process 104 with data so indicating. If computer process 104 is waiting to terminate execution, processing transfers to step 1018 (FIG. 10B) in which kernel 102 (FIG. 1) signals computer process 104 to thereby cause computer process 104 to terminate execution. Kernel 102 signals computer process 104 through a condition variable associated with computer process 104. Condition variables are known and standard synchronization objects of the Solaris operating system available from Sun Microsystems, Inc. Once signaled, computer process 104 proceeds to terminate execution. Processing transfers from step 1018 (FIG. 10B) to step 1020. In addition, if computer process 104 (FIG. 1) is not waiting to exit, processing transfers from test step 1016 (FIG. 10B) directly to step 1020.

In step 1020, kernel 102 (FIG. 1) resets the state of computer process 104 by clearing flags which represent respective components of the state of computer process 104. In particular, the flag of computer process 104 indicating that computer process 104 is in the hold state is cleared to indicate that computer process 104 is no longer in the hold state. Kernel 102 determines, in test step 1022 (FIG. 10B) to which processing transfers from step 1020, whether an error has occurred in the processing according to logic flow diagram 1000 by comparison of an error flag to a value which indicates no such error has occurred. If the error flag indicates that an error has occurred, processing transfers from test step 1022 to step 1070 (FIG. 10A). Conversely, if no such error has occurred, processing according to logic flow diagram 1000 terminates and execution of server thread 106 (FIG. 1) begins at the location within server thread 106 specified by field door_pc 1132 (FIG. 11), i.e., at the address within server thread 106 of subject procedure 106P as described above.

Execution of subject procedure 106P by server thread 106 begins at step 316 (FIG. 3) in which server thread 106 (FIG. 1) retrieves and unmarshals door data structure 800 (FIG. 8) from the stack of server thread 106 (FIG. 1) as server thread 106 would retrieve any arguments supplied in invocation of a procedure of server thread 106 by a computer instruction internal to server thread 106 as described above. In step 318 (FIG. 3), server thread 106 (FIG. 1) executes the subject procedure as described above. The particular computer instructions which prescribe the behavior of server thread 106 when performing step 318 (FIG. 3) are determined by the software engineers who develop and implement server thread 106 and subject procedure 106P, i.e., who define the particular computer instructions executed upon invocation of door 112 (FIG. 1). Once subject procedure 106P has been executed, server thread 106 invokes procedure door_return( ) which is executed by kernel 102 and is shown in logic flow diagram 1000 (FIGS. 10A and 10B).

In response to invocation by server thread 106 (FIG. 1), execution of procedure door_return( ) by kernel 102 begins at test step 1050 (FIG. 10A). In test step 1050, kernel 102 (FIG. 1) determines whether the client process, e.g., computer process 104, is still a computer process within computer system 200 (FIG. 2), i.e., has not been terminated, and is still waiting for completion of processing of door 112 (FIG. 1) by server thread 106. Kernel 102 determines whether computer process 104 is still a computer process which continues to wait for completion of processing of door 112 by comparing process state information corresponding to computer process 104 to data indicating that computer is in a wait state. If no process state information corresponding to computer process 104 is stored within kernel 102, computer process 104 has been terminated. If computer process 104 is in the wait state, computer process 104 is presumed to be waiting for completion of processing of door 112. If computer process 104 has been terminated or is no longer waiting for completion of processing of door 112, processing transfers from test step 1050 (FIG. 10A) to step 1070 which is described below. Conversely, if computer process has not been terminated and continues to wait for completion of processing of door 112 (FIG. 1), processing transfers from test step 1050 (FIG. 10A) to test step 1052.

In test step 1052, kernel 102 (FIG. 1) determines whether door data buffer 800 (FIG. 8), which is supplied to kernel 102 (FIG. 1) by server thread 106, contains any data to be transmitted to computer process 104 through door 112. Kernel 102 determines whether door data structure 800 (FIG. 8) contains any data by comparison of integer 806 of door data structure 800 to an integer whose value of zero. If integer 806 has a value of zero, and therefore indicates that door data structure 800 includes no data, processing transfers from test step 1052 (FIG. 10A) to step 1070, which is described in greater detail below. Conversely, if integer 806 (FIG. 8) has a value which is not zero, and therefore indicates that door data structure 800 includes data, processing transfers from test step 1052 (FIG. 10A) to step 1054.

In step 1054, kernel 102 (FIG. 1) prevents computer process 104 from exiting during movement of door data structure 800 (FIG. 8) into door 112 (FIG. 1) by setting the current state of computer process 104 (FIG. 1) to a hold state in which execution of computer process 104 is suspended. Processing transfers to step 1056 (FIG. 10A) in which kernel 102 (FIG. 1) marshals results from execution of server thread 106 into door 112 by moving door data structure 800 (FIG. 8) from the stack of server thread 106 (FIG. 1) into door 112. If the results are not successfully marshaled into door 112, processing transfers through test step 1058 (FIG. 10A) to step 1060 in which computer process 104 (FIG. 1) is awakened and to step 1062 (FIG. 10A) in which kernel 102 (FIG. 1) returns to computer process 104 error data indicating that processing of door 112 failed. Kernel 102 then resumes execution of computer process 104 and computer process 104 executes in response to such error data in accordance with the configuration of computer process 104 and the constituent computer instructions thereof. Conversely, if the results are successfully marshaled into door 112, processing transfers through test step 1058 (FIG. 10A) to test step 1064.

In test step 1064, kernel 102 (FIG. 1) determines whether computer process 104 continues to wait for completion of processing of door 112. If computer process 104 continues to wait, processing transfers to step 1066 (FIG. 10A) in which kernel 102 (FIG. 1) signals computer process 104 to release computer process 104 from the hold state in which computer process 104 is previously placed in step 1054 (FIG. 10A) as described above. If computer process 104 (FIG. 1) attempted to terminate processing while in the hold state, computer process 104 can terminate processing once signaled. Processing transfers from step 1066 (FIG. 10A), or, if computer process 104 (FIG. 1) is not waiting for door 112, directly from test step 1064 (FIG. 10A), to step 1068 in which kernel 102 (FIG. 1) resets the state of computer process 104 by clearing flags representing within the process state information of computer process 104 respective components of the state of computer process 104. Processing transfers from step 1068 (FIG. 10A) and from steps 1008 (FIG. 10B), 1022, and 1052 (FIG. 10A) as described above to step 1070.

In step 1070, kernel 102 (FIG. 1) releases server thread 106 to make server thread 106 available for processing subsequent invocations of door 112 by computer process 104 or other computer processes. Kernel 102 releases server thread 106 by adding a reference to server thread 106 to the linked list within kernel 102 of available threads which can process invocations of door 112. While thread 108 is described as creating only a single server process 106, thread 108 can, in one embodiment, create multiple server threads, each of which can processes a separate invocation of door 112 concurrently with others of the server threads created by thread 108. Processing transfers to step 1072 (FIG. 10A) in which kernel 102 (FIG. 1) suspends execution of procedure door_return( ) on behalf of server thread 106 and resumes execution of procedure door_call( ) on behalf of computer process 104 at test step 712 (FIG. 7), preserving error data indicating any errors which occurred during execution of procedure door_return( ) on behalf of server thread 106 (FIG. 1).

In test step 712 (FIG. 7), kernel 102 (FIG. 1) compares the stored error data to data indicating that no error has occurred. If no error has occurred, processing transfers to step 714 (FIG. 7) in which kernel 102 (FIG. 1) unmarshals door data buffer 800 (FIG. 8) from door 112 (FIG. 1) into a portion of memory 204 (FIG. 2) accessible by computer process 104 (FIG. 1) and specifically into the stack of computer process 104 (FIG. 1). Conversely, if an error has occurred, processing transfers from test step 712 (FIG. 7) to step 716 in which kernel 102 (FIG. 1) takes appropriate action depending on the particular error indicated by the stored error data. As described above with respect to steps 1060 (FIG. 10A) and 1062, kernel 102 passes to computer process 104 error data identifying an error which prevents server thread 106 from successfully serving an invocation of door 112 on behalf of computer process 104. Kernel 102 stores the error data in the process state information of computer process 104 such that, when processing of procedure door_call( ) by kernel 102 on behalf computer process 104 resumes, kernel 102 has immediate access to information regarding the processing of door 112. In one embodiment, kernel 102 places the error data on the stack of computer process 104 such that, from the perspective of computer process 104, the error data is returned from a called procedure which is internal to computer process 104. As a result, software developers configuring computer process 104 to invoke doors can implement an invocation of door 112 as if subject procedure 106P was internal to computer process 104, substantially simplifying including invocations of doors in client computer processes such as computer process 104.

Processing transfers from either step 714 (FIG. 7) or step 716 to step 718 in which kernel 102 (FIG. 1) (i) frees any resources of computer system 200 (FIG. 2) and, in particular, operating system 206 which were allocated to kernel 102 solely for the purpose of carrying out invocation of door 112 (FIG. 1) on behalf of computer process 104 and (ii) returns to computer processor 104 error data indicating any errors which might have occurred during invocation of door 112. After step 718 (FIG. 7), processing according to logic flow diagram 700 terminates and execution of computer process 104 (FIG. 1) continues with the computer instruction of computer process 104 which immediately follows invocation of door 112. Thus, from the perspective of computer process 104, invocation of door 112 begins when procedure door_call( ) is invoked and completes when procedure door_call( ) completes. As described above, execution of server thread 106 is suspended pending completion of procedure door_return( ) by kernel 102, and processing of procedure door_return( ) by kernel 102 is suspended at step 1072 (FIG. 10A) until processing of procedure door_return( ) is resumed in step 708 (FIG. 7) during processing by kernel 102 (FIG. 1) of a subsequent invocation of door 112. Execution of server thread 106 therefore remains suspended until a subsequent invocation of door 112.

Creating Server Thread 106

As described above, thread 108 creates server thread 106 in step 302 (FIG. 3) and server thread 106 waits for invocation of door 112 in step 306. In one embodiment, thread 108 of computer process 110 creates server thread 106 by invocation of the known procedure thread_create( ) or the known procedure pthread_create( ). Each of procedures thread_create( ) and pthread_create( ) are known but are briefly described here for completeness. A thread is an independent execution state of a computer process in which a procedure of the computer process executes concurrently with the other independent threads of the computer process. In creating server thread 106, computer process 110 specifies, as the procedure executed concurrently by server thread 106, procedure door_return( ) supplying data specifying door 112 as the door with respect to which server thread 106 performs procedure door_return( ). To create server thread 106, kernel 102 creates a new, independent state for computer process 110, which includes a separate stack and a separate program counter which in turn specifies the computer instruction of server thread 106 which is currently executing. Computer process 110 issues a computer instruction which causes kernel 102 to place a reference to the newly created thread on a linked list of referenced to threads which are available to service invocations of door 112, i.e., to perform subject procedure 106P in response to an invocation of door 112.

When processing by a particular thread completes, e.g., by execution of the computer instruction "return," the thread is destroyed. As described above, processing by server thread 106 does not complete upon completion of processing of subject procedure 106P but rather is suspended during execution of procedure door_return( ). Processing by server thread 106 can complete for other reasons however, e.g., in response to a fatal error in the processing of server thread 106 or in response to an unreferenced invocation of door 112 which indicates that no references to door 112 exist.

Door Methods

As described above, field v_ops 1108 (FIG. 11) of door node 502A contains a pointer to a collection of methods specific to door 112 for various procedures by which kernel 102 maintains resources on behalf of computer processes executing in computer system 200 (FIG. 2). Fields 1102–1126 (FIG. 11) of door node 502A have the same size, relative location, and data format, and are used in a directly analogous manner to, corresponding fields of any other vnode. Accordingly, most of the procedures by which kernel 102 maintains door 112 are not specifically adapted to maintain door 112. For example, in a preferred embodiment, the method provided through field v_ops 1108 (FIG. 11) of door node 502A for procedure open( ) includes no computer instructions other than a computer instruction "return" which indicates successful completion of the method. All processing by kernel 102 in response to invocation of procedure open( ) by a computer process, e.g., computer process 104, is therefore conventional in this preferred embodiment. A descriptor by which computer process 104 specifies door 112 is provided to computer process 104 by kernel 102 in a conventional manner.

Since the novel implementation of doors using an existing file system mechanism such as a vnode, many existing mechanisms by which a file system is utilized and maintained can be used to utilized and maintain doors without specific adaptation. Such has the dual advantages of simplifying the implementation of doors in operating system 206 and of providing to software engineers developing client computer processes such as computer process 104 a relatively simple and homogeneous interface by which doors and other resources are utilized and maintained. However, a few adaptations of methods used to utilize and maintain doors are included in the methods provided through field v_ops 1108 (FIG. 11). Each of the methods provided through field v_ops 1108 (FIG. 11) is sometimes referred to herein as a door method.

For example, in executing a door method for the procedure close( ), kernel 102 discards the descriptor provided to kernel 102 by the computer process invoking procedure close( ) and determines whether the discarded descriptor is the last existing descriptor to door 112. If the discarded descriptor is the last existing descriptor to door 112, kernel 102 issues an unreferenced invocation of door 112 if flag DOOR_UNREF 1138B (FIG. 13) indicates that issuance of such an unreferenced invocation is requested by computer process 110. In executing a door method for the procedure inactive( ), kernel 102 frees various resources allocated to kernel 102 for processing invocations of door 112 in the manner described above. In executing a door method for the procedure realvp( ), kernel 102 provides direct access to door node 502A by a computer process such as computer process 104, including fields 1128–114 (FIG. 11) of door node 502A. In executing a door method for the procedure getattr( ), kernel 102 kernel 102 returns to a computer process, e.g., computer process 104, data which specifies the type of resource of door 112, i.e., returns data indicating that door 112 is a door.

Unreferenced Invocations of Door 112

As described above, when the last reference to door 112 held by a client process, e.g., computer process 104, is discarded, e.g., by execution of procedure close( ), kernel 102 determines whether to issue an unreferenced invocation of door 112 by checking flag DOOR_UNREF 1138B (FIG. 13) of door node 502A (FIG. 11). If flag DOOR_UNREF 1138B (FIG. 13) is set, kernel 102 adds to the linked list of field door_ulist 1130 (FIG. 11) data specifying an unreferenced invocation of door 112 to thereby indicate that an unreferenced invocation of door 112 is pending. Unreferenced invocations of doors created by a particular computer process, e.g., computer process 110, are processed by a separate, dedicated thread of kernel 102, thereby avoiding process scheduling deadlocks in accessing door node 502A (FIG. 11) during the unreferenced invocations. Kernel 102 signals the dedicated thread which, in response, resumes execution and issues the unreferenced invocations specified in the linked list of field door_ulist 1140 (FIG. 11) of door node 502A. The processing of an unreferenced invocation of door 112 by server thread 106 is described above. By providing for special, unreferenced invocations of a door, a mechanism is provided by which server thread 106 can complete processing and thereby terminate once no referenced to door 112 exists.

The above description is illustrative only and is not limiting. For example, server thread 106 can execute on one computer of a computer network and computer process 104, which is the client computer process, can execute on another computer of the computer network. In addition, operating system 206 and kernel 102 can be distributed over multiple computers of a computer network. The present invention is therefore defined fully by the appended claims together with their full scope of equivalents.

What is claimed is:

1. A method for implementing remote procedure calling within a computer system, operation of which is managed by an operating system which includes file system data structures which in turn represent respective states of respective resources of the computer system, the operating system utilizing one or more resource control procedures for controlling the resources on behalf of a computer process, the method comprising:

forming in the operating system a door resource data structure which represents a door remote procedure calling resource, the door resource data structure including a file system data structure and one or more extensions which are adapted to represent the state of the door remote procedure calling resource; and controlling the door remote procedure calling resource on behalf of the computer processes by execution of one or more of the resource control procedures which in turn access the door resource structure to allow a remote procedure call to be made by the computer process utilizing the door resource data structure.

2. The method of claim 1 wherein the one or more extensions include one or more fields of data, each of which represents a component of the state of the door remote procedure calling resource.

3. The method of claim 2 wherein the one or more extensions include a data field which identifies a computer process which executes within the computer system and which is a server computer process which executes one or more server computer instructions in response to invocation of the door remote procedure calling resource.

4. The method of claim 3 wherein the one or more extensions further include a data field which specifies a first of the one or more server computer instructions.

5. The method of claim 1 wherein the file system data structure has a conventional organization; and further wherein the method further comprises combining the one or extensions with the selected conventional resource data structure such that conventional organization of the file system data structure is preserved.

6. The method of claim 5 wherein the step of forming the door resource data structure comprises appending to the conventional organization the one or more extensions.

7. The method of claim 1 wherein the file system data structures are each a vnode.

8. The method of claim 7 wherein the step of forming the door resource data structure comprising appending to the selected vnode the one or more extensions.

9. The method of claim 8 wherein the one or more extensions include one or more fields of data, each of which represents a component of the state of the door remote procedure calling resource.

10. A method for implementing remote procedure calling, the method comprising:

forming in an operating system a door resource data structure including a file system data structure with one or more extensions;

constructing the client computer process which when executed will utilize the door resource data structure in the operating system to place a remote procedure call;

executing the client computer process;

the client process requesting from the operating system access to the remote procedure for execution by a server computer process by supplying to the operating system a name associated with the remote procedure; and the client process receiving from the operating system a file descriptor which identifies the remote procedure within the operating system.

11. A remote procedure calling system implemented in an operating system which includes file system data structures which in turn represent respective states of respective resources of a computer system, whose operation is controlled by the operating system, the operating system utilizing one or more resource control procedures for controlling the resources on behalf of one or more computer processes, the remote procedure calling system comprising:

a door resource data structure which represents a door remote procedure calling resource which includes a file system data structure and one or more extensions which are operatively coupled to the file system data structure and which are adapted to represent the state of the door remote procedure calling resource; and wherein one or more of the resource control procedures are operatively coupled to the door resource data structure and are configured to control the door remote procedure calling resource on behalf of the one or more computer processes to allow remote procedure calls to be made by one or more computer processes.

12. The remote procedure calling system of claim 11 wherein the one or more extensions include one or more fields of data, each of which represents a component of the state of the door remote procedure calling resource.

13. The remote procedure calling system of claim 12 wherein the one or more extensions include a data field which identifies a computer process which executes within the computer system and which is a server computer process which executes one or more server computer instructions in response to invocation of the door remote procedure calling resource.

14. The remote procedure calling system of claim 13 wherein the one or more extensions further include a data field which specifies a first of the one or more server computer instructions.

15. The remote procedure calling system of claim 11 wherein the file system data structure has a conventional organization; and further wherein the one or more extensions are coupled to the file system data structure such that the conventional organization of the file system data structure is preserved.

16. The remote procedure calling system of claim 15 wherein the one or more extensions are appended to the conventional organization.

17. The remote procedure calling system of claim 11 wherein the file system data structures are each a vnode.

18. The remote procedure calling system of claim 17 wherein the one or more extensions are appended to the selected vnode.

19. The remote procedure calling system of claim 18 wherein the one or more extensions include one or more fields of data, each of which represents a component of the state of the door remote procedure calling resource.

20. A remote procedure calling system comprising:

a door resource data structure which represents a door remote procedure calling resource, the door resource data structure including a file system data structure and one or more extensions which are adapted to represent the state of the door remote procedure calling resource;

a name module which is configured to receive from a client computer process a name associated with a remote procedure for execution by a server computer process; and a file descriptor production module which is coupled to the name module and which provides to the client computer process a file descriptor which identifies the remote procedure;

wherein, the door remote procedure calling resources controlled by the remote procedure calling system to allow a remote procedure call to be made.

21. A computer system comprising a computer processor, a memory operatively coupled to the computer processor, one or more resources operatively coupled to the computer processor, and an operating system which is operatively coupled to the computer processor and the memory, the operating system including:

file system data structures which represent respective states of respective ones of the resources;

one or more resource control procedures for controlling the resources on behalf of one or more computer processes, wherein the resources include a door resource data structure which represents door remote procedure calling resource, the door resource data structure further including a file system data structure and one or more extensions which are operatively coupled to the file system data structure and which are adapted to represent the state of the door remote procedure calling resource; and wherein the resource control procedures are operatively coupled to the door resource data structure and are configured to control the door remote procedure calling resource on behalf of the one or more computer processes to allow remote procedure calls to be made by one or more of the computer processes.

22. The computer system of claim 21 wherein the one or more extensions include one or more fields of data, each of which represents a component of the state of the door remote procedure calling resource.

23. The computer system of claim 22 wherein the one or more extensions include a data field which identifies a computer process which executes within the computer system and which is a server computer process which executes one or more server computer instructions in response to invocation of the door remote procedure calling resource.

24. The computer system of claim 23 wherein the one or more extensions further include a data field which specifies a first of the one or more server computer instructions.

25. The computer system of claim 21 wherein the file system data structure has a conventional organization; and further wherein the one or more extensions are coupled to the file system data structure such that the conventional organization conventional resource data structure is preserved.

26. The computer system of claim 25 wherein the one or more extensions are appended to the conventional organization.

27. The computer system of claim 21 wherein the file system structures are each a vnode.

28. The computer system of claim 27 wherein the one or more extensions are appended to the selected vnode.

29. The computer system of claim 28 wherein the one or more extensions include one or more fields of data, each of which represents a component of the state of the door remote procedure calling resource.

30. A computer program product comprising:

a computer usable medium having computable readable code embodied therein for implementing remote procedure calling in an operating system which includes file system data structures which in turn represent respective states of respective resources of a computer system, whose operation is controlled by the operating system, and which includes one or more resource control procedures for controlling the resources on behalf of one or more computer processes, the computer readable code comprising:

a door structure maintenance module configured to maintain a door resource data structure which represents a door remote procedure calling resource, the door resource data structure including a file system data structure and one or more extensions which are operatively coupled to the file system data structure and which are adapted to represent the state of the door remote procedure calling resource; and a door resource control module which is operatively coupled to the door structure maintenance module and which includes one or more of the resource control procedures, which are operatively coupled to the door resource data structure and which are configured to control the door remote procedure calling resource on behalf of the one or more computer processes to allow remote procedure calls to be made.

31. The computer program product of claim 30 wherein the one or more extensions include one or more fields of data, each of which represents a component of the state of the door remote procedure calling resource.

32. The computer program product of claim 31 wherein the one or more extensions include a data field which identifies a computer process which executes within a computer system and which is a server computer process which executes one or more server computer instructions in response to invocation of the door remote procedure calling resource.

33. The computer program product of claim 32 wherein the one or more extensions further include a data field which specifies a first of the one or more server computer instructions.

34. The computer program product of claim 31 wherein the file system data structure has a conventional organization; and further wherein the one or more extensions are coupled to the file system data structure such that the conventional organization of the file system data structure is preserved.

35. The computer program product of claim 34 wherein the one or more extensions are appended to the conventional organization.

36. The computer program product of claim 31 wherein the file system data structures are each a vnode.

37. The computer program product of claim 36 wherein the one or more extensions are appended to the selected vnode.

38. The computer program product of claim 37 wherein the one or more extensions include one or more fields of data, each of which represents a component of the state of the door remote procedure calling resource.

* * * * *